(12) United States Patent
Mueller et al.

(10) Patent No.: US 7,451,612 B2
(45) Date of Patent: Nov. 18, 2008

(54) GEOTHERMAL EXCHANGE SYSTEM INCORPORATING A THERMALLY SUPERCONDUCTING MEDIUM

(75) Inventors: Lynn Mueller, Richmond (CA); Mark McCooey, Richmond (CA); John Graham, Vancouver (CA); David Todd, Vancouver (CA)

(73) Assignee: Free Energy Solutions Inc., Richmond, BC (CA)

( * ) Notice: Subject to any disclaimer, the term of this patent is extended or adjusted under 35 U.S.C. 154(b) by 253 days.

(21) Appl. No.: 11/532,023

(22) Filed: Sep. 14, 2006

(65) Prior Publication Data
US 2007/0068184 A1   Mar. 29, 2007

(30) Foreign Application Priority Data
Sep. 14, 2005   (CA) .................................. 2526321

(51) Int. Cl.
*F25D 23/12* (2006.01)
(52) U.S. Cl. ........................................................ 62/260
(58) Field of Classification Search ............... 62/260, 62/324.1; 165/45, 160, 253
See application file for complete search history.

(56) References Cited

U.S. PATENT DOCUMENTS

| | | | |
|---|---|---|---|
| 4,718,248 A | 1/1988 | Fisher | |
| 4,993,483 A | 2/1991 | Harris | |
| 5,542,471 A | 8/1996 | Dickinson | |
| 5,590,715 A * | 1/1997 | Amerman | .................... 166/290 |
| 5,671,608 A | 9/1997 | Wiggs et al. | |
| 6,132,823 A | 10/2000 | Qu | |
| 6,212,896 B1 * | 4/2001 | Genung | ........................ 62/260 |
| 6,301,893 B1 | 10/2001 | Luo | |
| 6,779,341 B2 | 8/2004 | Luo | |
| 6,811,720 B2 | 11/2004 | Qu | |
| 2003/0066638 A1 | 4/2003 | Qu et al. | |

FOREIGN PATENT DOCUMENTS

| | | |
|---|---|---|
| WO | WO 99/42768 A1 | 8/1999 |
| WO | WO 02/35091 A2 | 5/2002 |
| WO | WO03016811 A3 | 2/2003 |
| WO | WO 2004/013551 A1 | 2/2004 |

* cited by examiner

*Primary Examiner*—Melvin Jones
(74) *Attorney, Agent, or Firm*—McAndrews, Held & Malloy, Ltd.

(57) ABSTRACT

A geothermal heating and cooling system is thermally coupleable to a ground coil formed from a thermal superconductor material. The system includes a heat intensification circuit, a thermal superconductor heat exchange coil and a thermal switch coupling the intensifying heat exchanger to the superconductor heat exchanger, and a thermostat controller connected to the thermal switch and intensifying heat exchanger. The system employs a high thermal transfer superconductor to efficiently move heat to and from the earth source for the purpose of heating and cooling. The system operates in cooling and heating modes by controlling the thermal switches and activating the heat intensification circuit in response to the difference between a set point and a measured temperature. Heat can be transferred to and from the superconductor heat exchange coil through various air and liquid exchange subsystems including fans, direct and indirect liquid heat exchange.

75 Claims, 19 Drawing Sheets

GEOTHERMAL EXCHANGE SYSTEM INCORPORATING A THERMALLY SUPERCONDUCTING MEDIUM

FIELD OF THE INVENTION

The present invention relates generally to geothermal exchange systems, and more particularly to a geothermal exchange system incorporating superconducting heat transfer elements.

BACKGROUND OF THE INVENTION

Ground source heat pump systems, also known geothermal or geoexchange systems, have been used for heating and cooling buildings for more than half a century. More than ten years ago, the Environmental Protection Agency evaluated all available heating and cooling technologies and concluded that ground source heat pump systems were the most energy efficient systems available in the consumer marketplace.

Conventional ground source heat pump systems operate on a simple principle. In the heating mode they collect heat energy from the ground and transfer it to a heat pump, which concentrates the heat and transfers it to a building's heat distribution system which in turn heats the building. In the cooling mode, heat from the building is collected by the cooling system and transferred to the heat pump, which concentrates the energy and transfers it to a ground source loop, which transfers the heat to the ground. In both modes, only a small amount of the heat comes from the electricity that runs the compressor; most of the heating and cooling energy comes from the ground. This allows ground source heat pump systems to achieve more than 100% efficiency: every unit of electrical energy consumed by the heat pump produces more useable heat than an electrical resistance heater can produce with the same unit of electricity.

Even though ground source heat pump systems achieve efficiencies of up to 350% compared to less than 100% for many conventional systems, they have been slow to penetrate the consumer marketplace because of high capital costs, high installation costs, difficult installation procedures and low energy cost savings due to historically low energy prices.

These high capital and installation costs have largely been due to fundamental inefficiencies in the ground loop subsystem. In a typical installation, the ground loop consists of hundreds or thousands of feet of looped plastic piping buried in deep trenches or deep holes drilled into the ground. An antifreeze solution such as glycol is pumped through this loop to absorb heat energy from the ground (in the heating mode) or transfer heat energy to the ground (in the cooling mode.) Few installations have sufficient available land for trenching so loops are most commonly installed in deep holes and this makes them relatively expensive for several reasons.

First, each loop consists of a supply and return line, which must fit down the same hole. With an outer diameter of an inch or more for each pipe and a tendency for these pipes to bow away from each other due to the plastic material's memory of being coiled for shipment, the hole typically needs to have a diameter of 4 to 6 inches to allow the loop to be installed. Holes of this size are relatively expensive to drill and require heavy equipment that disrupts landscaping, making it expensive to retrofit existing homes. Holes of this size also leave large voids around the loop that must be filled with materials such as bentonite clay in order for heat to transfer from the ground to the loop, which adds significantly to the cost of installation.

Second, having both supply and return lines in the same hole results in thermal "short circuiting" which reduces the efficiency of the loop. In the heating mode, for example, cool fluid from the heat pump absorbs heat from the ground as it goes down the supply line in the hole, cooling the ground around the pipe. When the warmed fluid comes back up the hole in the return line, it passes through the ground that was just cooled, losing some of the heat it has just picked up. This lowers the efficiency of the loop so the loop must be made longer to compensate, adding to the cost of drilling and piping.

Third, for the ground loop to function, the antifreeze solution must be pumped through hundreds or thousands of feet of small diameter piping. This consumes a significant amount of electric energy, lowering the overall efficiency of the system.

In recent years, a new ground source heat pump technology has evolved to overcome some of the inefficiencies of conventional systems. This technology, called "direct geoexchange," replaces the conventional plastic ground loop with a small-diameter copper loop. Instead of an antifreeze solution, direct geoexchange systems pump a refrigerant through the loop to pick up heat from the ground or give off heat to the ground in the same way that conventional ground loops function.

Direct geoexchange has some significant advantages over conventional systems. First, the direct geoexchange loop runs directly to and from the heat pump's compressor, eliminating the heat exchanger that is required by conventional systems to transfer heat from the loop to the heat pump. Second, the small diameter of the direct exchange loop makes it possible for loops to be installed in smaller diameter holes in the ground; this reduces the cost of drilling and backfilling the holes and reduces the size of the drill rig required to drill the holes, decreasing damage to landscaping in retrofit applications. Third, the copper pipes used in direct geoexchange transfer heat more efficiently to and from the ground so the total length of loop required is typically less than conventional systems. Because of these improvements, direct geoexchange systems can be cheaper than conventional ground source systems and more energy efficient.

In spite of these inherent advantages, direct geoexchange also has some significant disadvantages. First, both supply and return pipes run in the same hole, so the thermal short circuit problems of conventional systems remain. Second, the loop system pumps much more refrigerant through many more feet of piping past many more connections than conventional systems, so the potential for refrigerant leaks is increased. Third, direct geoexchange requires large volumes of refrigerant to flow through the loop, behaving differently in the heating and cooling modes, and requiring additional refrigerant reservoirs and flow control systems to compensate. Fourth, changing from heating to cooling modes requires the system to have expensive and often unreliable reversing valves in the refrigerant lines. Because of these inefficiencies, direct geoexchange is only able to achieve a modest 15% improvement in total energy efficiency over conventional ground source heat pump systems.

Direct geoexchange and conventional ground source heat pump systems have additional limitations. Both require a significant amount of electrical power to pump fluids through hundreds or thousands of feet of piping. This not only limits overall system efficiency but also limits the environments in which it can be installed. This kind of power is not often available or reliable in the world's developing countries, so existing ground source heat pump systems have limited potential to penetrate broad world markets. In addition, since both systems are designed to heat and cool whole buildings, neither can efficiently be installed on the incremental room-by-room basis on which most of the world adopts heating and air conditioning.

In summary, conventional geoexchange systems and direct expansion geoexchange systems have significant limitations in energy efficiency, installation cost and installation flexibility.

There is a need for a geothermal exchange system that operates without a refrigerant loop, utilizes much less power than conventional refrigerant or coolant based geoexchange systems, results in lightweight heat exchangers, that can be configured in a wide range of interior locations, has an extended lifetime due to fewer parts and no circulating fluids, has reduced ground loop installation costs and provides enhanced cooling and heating efficiency compared to power used.

SUMMARY OF THE INVENTION

The above and other shortcomings of conventional geoexchange systems and direct expansion geoexchange systems are overcome by a superconductor geothermal exchange system having a plurality of thermal superconductors coupleable to at least one outside ground coil formed from a thermal superconductor material and extending below ground level to allow passive thermal conduction between an earth source and an above-ground thermal superconductor segment. The system comprises:

(a) an intensifying heat exchanger comprising:
  (1) a refrigerant coil receiving refrigerant in a heating and cooling cycle, the refrigerant coil having a condenser heat exchange segment and an evaporator heat exchange segment;
  (2) an evaporator for expanding liquid refrigerant to a vaporous state, the evaporator located between the condenser heat exchange segment and the evaporator heat exchange segment;
  (3) a compressor for compressing and circulating refrigerant in the refrigerant coil;
(b) a heat exchange coil formed from thermal superconductor material, the heat exchange coil having a transfer segment comprising, at opposite ends, a first thermal superconductor exchange segment and a second thermal superconductor exchange segment;
(c) a ground coil thermal switch thermally coupleable to the condenser and evaporator heat exchange segments and the above-ground thermal superconductor exchange segment, such that in a first switch position the above-ground thermal superconductor exchange segment is thermally coupled to the condenser heat exchange segment to operate in a cooling mode, and in a second switch position the above-ground thermal superconductor exchange segment is thermally coupled to the evaporator heat exchange segment to operate in a heating mode;
(d) a heat exchange thermal switch thermally coupleable to the condenser and evaporator heat exchange segments and the second thermal superconductor exchange segment, such that in a first switch position the second thermal superconductor exchange segment is thermally coupled to the evaporator heat exchange segment to operate in a cooling mode, and in a second switch position the second thermal superconductor exchange segment is thermally coupled to the condenser heat exchange segment to operate in a heating mode;
(e) a thermostat controller associated with an indoor space, the thermostat controller programmable with a desired set point temperature, the thermostat controller electrically connected to a thermal sensor for measuring the indoor space temperature, the thermostat controller electrically connected to the heat exchange thermal switch, the ground coil thermal switch and the compressor.

The ground coil thermal switch and the heat exchange thermal switch place the system in one of the heating and cooling modes, and the switch positions are selected in response to a calculated difference between the set point temperature and the measured temperature, the controller actuating the compressor in response to the calculated difference.

In a preferred embodiment, the superconductor geothermal exchange system further comprises a plurality of thermal superconductor heat exchange coils coupled to a plurality of associated heat exchange thermal switches coupled to the condenser and evaporator heat exchange segments. The heat exchange thermal switches are preferably independently connected to the thermostat controlled, at least one of the heat exchange thermal switches is thermally coupled to the exchange segment opposing the ground coil coupled exchange segment and the remainder of the heat exchange thermal switches are independently switchable, and set point temperatures associated with each heat exchange coil are programmable in the thermostat controller, thereby providing independently controlled heating and cooling of the plurality of coils.

In a preferred embodiment, the superconductor geothermal exchange system further comprises a plurality of temperature measuring devices associated with the plurality of heat exchange coils to provide independent temperature measurements, and the plurality of heat exchange switches are switchable in response to respective calculated differences between the individual measured temperatures and corresponding set point temperatures.

In a preferred embodiment, the superconductor geothermal exchange system further comprises a plurality of blowers positioned proximal to each of the heat exchange coils and electrically connected to the controller, such that each blower is actuateable in response to respective calculated differences between the temperature measurements and associated set point temperatures.

In a preferred embodiment, the superconductor geothermal exchange system further comprises a plurality of thermal superconductor heat exchange coils and a plurality of associated heat exchange thermal switches coupled to a pair of thermal superconductor heat transfer buses, the heat transfer buses coupled, respectively, to the condenser and evaporator heat exchange segments, the heat transfer buses thermally connected, respectively, to the plurality of associated heat exchange thermal switches, wherein at least one of the heat exchange thermal switches is thermally coupled to the exchange segment opposing the ground coil coupled exchange segment and the remainder of the heat exchange thermal switches are independently switchable, thereby operating in independent heating and cooling modes at different locations in the indoor space.

In a preferred embodiment, the superconductor geothermal exchange system further comprises at least one outside ground coil formed from a thermal superconductor material, the at least one outside ground coil extending below ground level allowing passive thermal conduction to the earth source, the at least one outside ground coil having an above-ground thermal superconductor exchange segment. In this embodiment, system coefficient of performance is preferably greater than 2.0.

In a preferred superconductor geothermal exchange system, the thermal superconductor material is an inorganic heat transfer medium. The heat transfer medium is preferably disposed in a sealed heat transfer pipe. The thermal superconductor material is preferably disposed in heat transfer pipes, each of the heat transfer pipes insulated along at least a portion thereof, the heat transfer pipes having thermal conductivity greater than 100 times elemental silver thermal conductivity and having substantially negligible heat loss along the thermal superconductor segment.

In a preferred embodiment, the superconductor geothermal exchange system, the compressor is operable at consumed power less than 4500 W, more preferably at consumed power less than 1800 W.

In a preferred embodiment, the superconductor geothermal exchange system further comprises a power adapter connected to the compressor and the controller. The power adapter is preferably a power converter coupleable to an alternative energy source selected from the group consisting of a photovoltaic array, a wind generator and a fuel cell. The power adapter also preferably a power converter for converting AC power to DC power, the DC power supplied to the compressor. The power converter preferably comprises a power conditioning circuit for converting unconditioned electric power from an alternative energy source to conditioned electric power suitable to operate the compressor.

In a preferred superconductor geothermal exchange system, the ground coil thermal switch and the heat exchange switch comprise heat transfer components formed of thermal superconductor material.

In a preferred superconductor geothermal exchange system, at least a portion of the thermal superconductor material is formed in discrete segments connected by thermally conducting joiners.

In a preferred superconductor geothermal exchange system, at least a portion of the thermal superconductor material is formed in discrete segments connected by substantially thermally conducting joiners.

In a preferred embodiment, the superconductor geothermal exchange system further comprises a coupler separating the above-ground thermal superconductor segment into two thermally coupled segments.

In a preferred embodiment, the superconductor geothermal exchange system further comprises a blower positioned proximal to the first thermal superconductor exchange segment of the heat exchange coil, and wherein the controller is electrically connected to the blower to actuate the blower in response to a calculated difference between the measured temperature and the set point temperature. The first thermal superconductor exchange segment is preferably arranged as a condenser array with area substantially corresponding to the blower area, thereby increasing heat exchange with air.

In a preferred embodiment, the superconductor geothermal exchange system further comprises an auxiliary heat exchange fluid circulation loop thermally coupled to the first thermal superconductor exchange segment, the loop comprising a fluid circulation device. A preferred heat exchange fluid is water and a preferred fluid circulating device is a water pump. In a preferred embodiment, the auxiliary heat exchange fluid circulation loop supplies heat to a surface of the space, supplies heat to potable water, and recovers heat from wastewater. The preferred heat exchange fluid is a refrigerant and the preferred fluid circulation device comprises a compressor and an evaporator.

In a preferred superconductor geothermal exchange system, the heat exchange fluid is directed to a refrigerator.

In a preferred embodiment, the superconductor geothermal exchange system further comprises a wireless signal receiver electrically connected to the thermostat controller and a remote control device for transmitting wireless signals to the receiver, the set point temperature programmable from the remote control device.

In a preferred superconductor geothermal exchange system, a segment of the heat exchange coil is arranged as a thermal conductor bus thermally coupled to a plurality of the first thermal superconductor segments. A plurality of blowers is preferably positioned proximal to each of the first thermal superconductor exchange segments and electrically connected to the controller, such that a plurality of heat exchanges can occur at a plurality of locations in the space. A plurality of thermal sensors is preferably associated with the plurality of locations and electrically connected to the controller.

In a preferred embodiment, the superconductor geothermal exchange system further comprises:
  (i) a first enclosure for housing the power supply, the controller, the intensifying heat exchanger and the ground coil thermal switch; and the heat exchange thermal switch;
  (ii) a second enclosure for housing the first thermal superconductor exchange segment, a blower positioned proximal to the first thermal superconductor exchange segment, the second enclosure having at least one vent in fluid communication with the blower, wherein the first enclosure has openings formed therein such that the ground thermal switch is thermally coupleable to the above-ground thermal superconductor segment, and wherein the first enclosure and the second enclosure are thermally connected by at least the second thermal superconductor exchange segment and an electrically connected control line to the blower.

In a preferred superconductor geothermal exchange system, the controller is electrically connected to the blower.

In a preferred superconductor geothermal exchange system, operating noise from the second enclosure is less than 45 dB during in the heating and cooling modes.

In a preferred embodiment, the superconductor geothermal exchange system further comprises:
  (i) a first enclosure for housing the power supply, the controller, the intensifying heat exchanger and the ground coil thermal switch; and the heat exchange thermal switch;
  (ii) a second enclosure for housing the first thermal superconductor exchange segment, a blower positioned proximal to the first thermal superconductor exchange segment, the second enclosure having at least one vent in fluid communication with the blower, wherein the first enclosure has openings formed therein such that the ground thermal switch is thermally coupleable to the above-ground thermal superconductor segment, and wherein the first enclosure and the second enclosure are thermally connected by at least the second thermal superconductor exchange segment and electrically connected by a control line to the blower.

In a preferred embodiment, the superconductor geothermal exchange system further comprises a pair of thermal superconductor heat distribution transfer buses thermally coupled, respectively, to the condenser heat exchange segment and the evaporator heat exchange segment, the heat distribution transfer buses thermally connectable to the thermal switches.

In a preferred embodiment, the superconductor geothermal exchange system further comprises a superconductor earth source bypass thermal switch electrically connected in series between the ground coil thermal switch and the intensifying heat exchanger such that when the earth source bypass thermal switch is disconnected, the heat exchange thermal switch and the ground coil thermal switch are switched to a common thermal transfer bus such that heat is transferred directly from the heat exchange coil to the ground coil through the heat bus and the switches.

In a preferred superconductor geothermal exchange system, at least a portion of the thermal superconductors are formed in discrete segments connected by thermally conducting joiners.

In a preferred superconductor geothermal exchange system, the earth source bypass switch is disconnected in a programmed bypass operating mode, such that the intensifying heat exchanger is bypassed and direct heat transfer is provided in a direct cooling mode, the switch disconnection maintained for a programmed minimum cooling rate.

In a preferred embodiment, the superconductor geothermal exchange system further comprises a plurality of thermal superconductor heat exchange coils thermally coupled to a plurality of associated heat exchange thermal switches having an off-position coupled to the heating and cooling exchange buses, the heat exchange thermal switches independently connected to the thermostat controller, at least one earth source bypass thermal switch thermally connected in series between the ground coil thermal switch and the intensifying heat exchanger and electrically connected to the controller. In a programmed bypass operating mode, the earth source thermal switch is disconnected and the plurality of heat exchange thermal switches are independently switched to one of the heating and cooling exchange buses, and at least one heat exchange coil is thermally connected to the cooling exchange bus in cooling mode and one heat exchange coil is thermally connected to the heating exchange bus in heating mode such that a heat exchange circuit is completed independently of earth source heat exchange.

In a preferred superconductor geothermal exchange system, the ground coil thermal switch and the heat exchange thermal switch are embodied in a 2-way thermal switch electrically connected to the condenser and evaporator heat exchange segments and to the second thermal superconductor exchange segment. The 2-way switch is coupleable to the above-ground thermal superconductor segment such that in a first switch position the above-ground thermal superconductor segment is thermally coupleable to the condenser heat exchange segment and the second thermal superconducting exchange segment is thermally coupled to the evaporator heat exchange segment to operate in a cooling mode, and in a second switch position the above-ground thermal superconductor segment is thermally coupleable to the evaporator heat exchange segment and the second thermal superconductor exchange segment is thermally coupled to the condenser heat exchange segment to operate in a heating mode.

The above and other shortcomings of conventional geoexchange systems and direct expansion geoexchange systems are overcome by a superconductor geothermal exchange system having a plurality of thermal superconductors coupleable to at least one outside ground coil formed from a thermal superconductor material and extending below ground level to allow passive thermal conduction between an earth source and an above-ground thermal superconductor segment. The system comprises:

(a) a heat exchange coil formed from thermal superconductor material, having a heat transfer segment terminating at opposite ends at a first thermal superconductor exchange segment and a second thermal superconductor exchange segment;

(b) a reversible intensifying heat exchanger comprising:
(1) a refrigerant coil receiving refrigerant in a heating and cooling cycle, the refrigerant coil comprising:
(i) a first heat exchange segment thermally coupled to the second thermal superconductor exchange segment;:
(ii) a second exchange segment of the coil thermally coupleable to the above-ground thermal superconductor segment;:
(2) a bi-directional expander for expanding liquid refrigerant to a vaporous state, the expander located between the first and second thermal superconductor exchange segments;
(3) a compressor for compressing and circulating refrigerant in the refrigerant coil;
(4) a reversing valve fluidly to each of the first and second thermal superconductor exchange segments, the reversing valve controlling the direction of flow of the refrigerant exiting the compressor, the reversing valve operable between a cooling position, in which the refrigerant is circulated through the first thermal superconductor exchange segment, and a heating position, in which the refrigerant is circulated through the second exchange segment;
(c) a thermostat controller associated with an indoor space, the thermostat programmable with a desired set point temperature, the thermostat controller electrically connected to a thermal sensor for measuring the indoor space temperature, the thermostat controller electrically connected to the compressor and to the reversing valve for selectively moving the reversing valve between the cooling position and the heating position;

The reversing valve is controlled to select one of a heating mode and a cooling mode, the valve position being selected in response to a calculated difference between the set point temperature and the measured temperature, the controller actuating the compressor in response to the calculated difference.

In a preferred embodiment, the superconductor geothermal exchange system further comprises at least one outside ground coil formed from a thermal superconductor material, the at least one outside ground coil extending below ground level allowing passive thermal conduction to the earth source. In this embodiment, system coefficient of performance is greater than 2.0.

In a preferred superconductor geothermal exchange system, at least a portion of the thermal superconductor material is formed in discrete segments connected by thermally conducting joiners.

In a preferred embodiment, the superconductor geothermal exchange system further comprises a coupler separating the above-ground thermal superconductor segment into two thermally coupled segments.

In a preferred embodiment, the superconductor geothermal exchange system further comprises a blower positioned proximal to the first thermal superconductor exchange segment of the heat exchange coil, and wherein the controller is electrically connected to the blower to actuate the blower in response to a calculated difference between the measured temperature and the set point temperature. The first thermal superconductor exchange segment is preferably arranged as a condenser array with area substantially corresponding to the blower area, thereby increasing heat exchange with air.

In a preferred embodiment, the superconductor geothermal exchange system further comprises an auxiliary heat exchange fluid circulation loop thermally coupled to the first thermal superconductor exchange segment, the loop comprising a fluid circulation device. The preferred heat exchange fluid is water and the preferred fluid circulating device is a water pump. The auxiliary heat exchange fluid circulation loop preferably supplies heat to a surface of the space, supplies heat to potable water, and recovers heat from wastewater.

In a preferred superconductor geothermal exchange system, the heat exchange fluid is a refrigerant and the fluid circulation device comprises a compressor and an evaporator. The heat exchange fluid is preferably directed to a refrigerator.

In a preferred embodiment, the superconductor geothermal exchange system further comprises a wireless signal receiver electrically connected to the thermostat controller and a remote control device for transmitting wireless signals to the receiver, the set point temperature programmable from the remote control device.

In a preferred superconductor geothermal exchange system, a segment of the heat exchange coil is arranged as a thermal conductor bus thermally coupled to a plurality of the first thermal superconductor segments.

In a preferred embodiment, the superconductor geothermal exchange system further comprises a plurality of blowers positioned proximal to each of the first thermal superconductor exchange segments and electrically connected to the controller, whereby a plurality of heat exchanges can occur at a plurality of locations in the space. More preferably, a plurality of thermal sensors associated with the plurality of locations and electrically connected to the controller.

In a preferred embodiment, the superconductor geothermal exchange system further comprises:
 (i) a first enclosure for housing the power supply, the controller, the intensifying heat exchanger;
 (ii) a second enclosure for housing the first thermal superconductor exchange segment, a blower positioned proximal to the first thermal superconductor exchange segment, the second enclosure having at least one vent in fluid communication with the blower.

The first enclosure has openings formed therein such that the ground thermal switch is thermally coupleable to the above-ground thermal superconductor segment, and wherein the first enclosure and the second enclosure are thermally connected by at least the second thermal superconductor exchange segment and electrically connected by a control line to the blower. The controller is preferably electrically connected to the blower. The operating noise from the second enclosure is preferably less than 45 dB during in the heating and cooling modes.

In a preferred embodiment, the superconductor geothermal exchange system further comprises an enclosure for housing the power supply, the controller, the intensifying heat exchanger, the first thermal superconductor exchange segment, a blower positioned proximal to the first thermal superconductor exchange segment, the enclosure having venting near the blower, wherein the first enclosure has openings formed therein such that the ground thermal switch is thermally coupleable to the above-ground thermal superconductor segment.

In a preferred superconductor geothermal exchange system, the first thermal superconductor exchange segment is arranged as a condenser array with area substantially corresponding to the blower area, thereby increasing heat exchange with air.

BRIEF DESCRIPTION OF THE DRAWING(S)

Figure 3A:
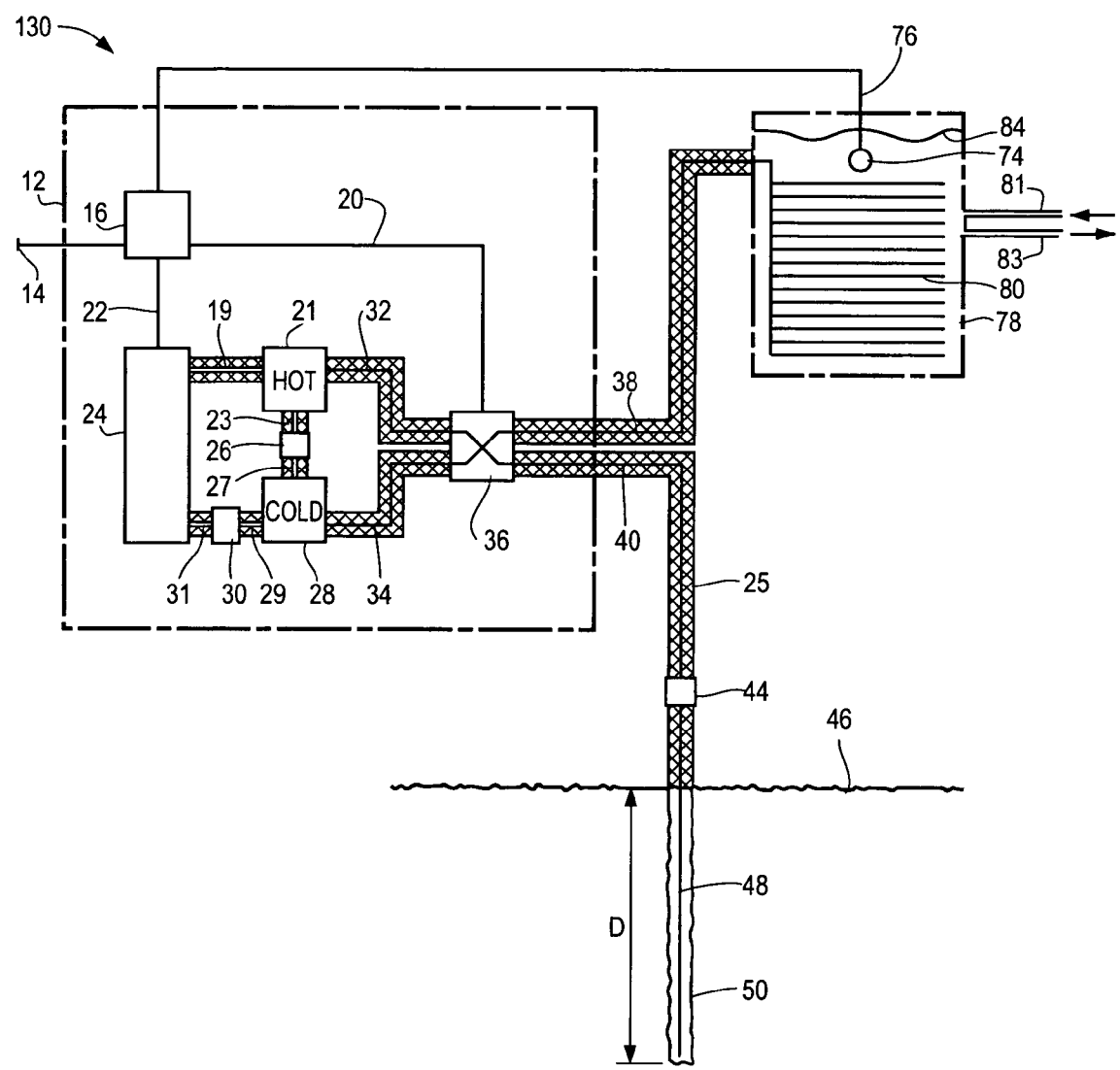
Figure 3B:
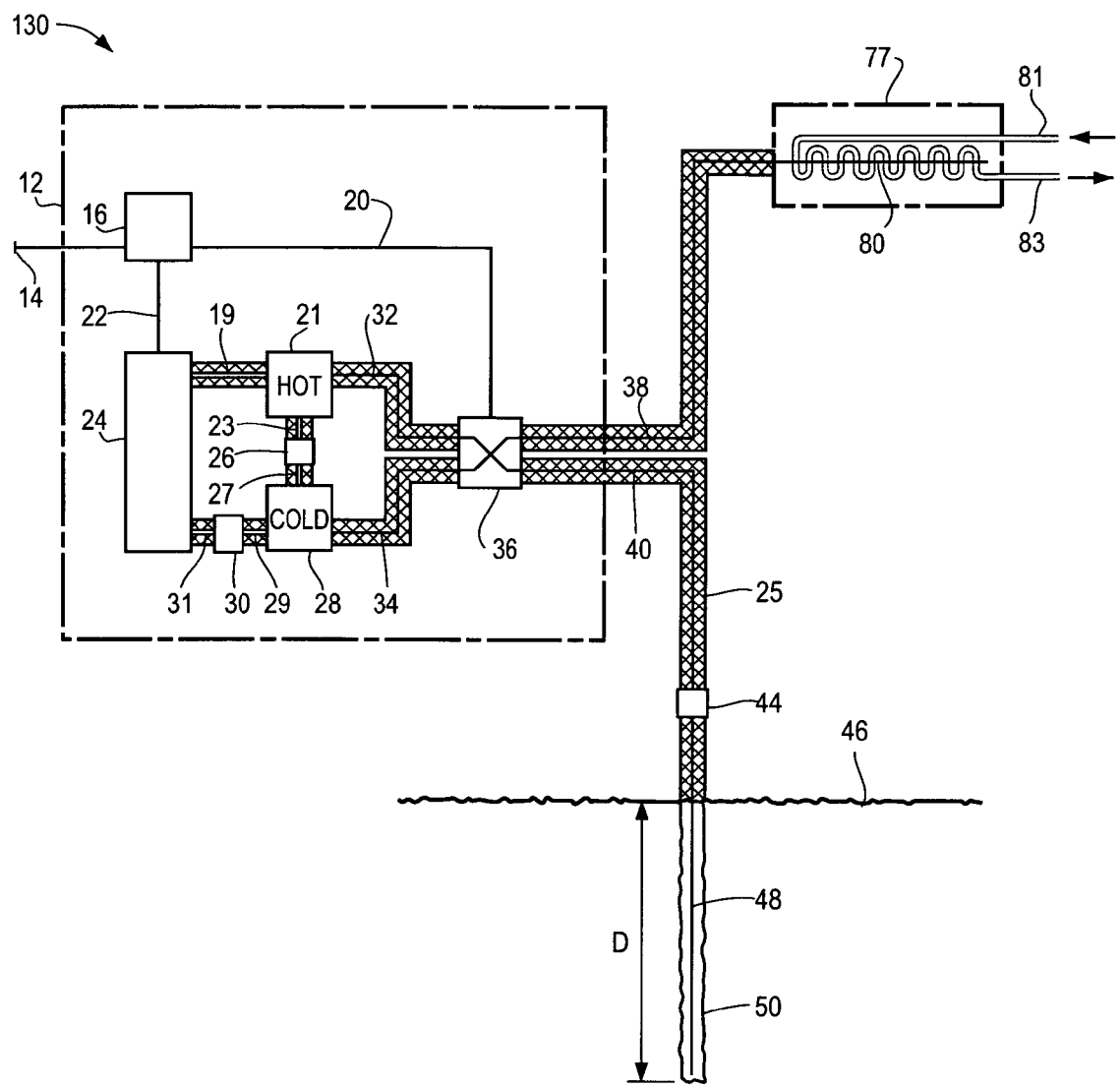
Figure 3C:
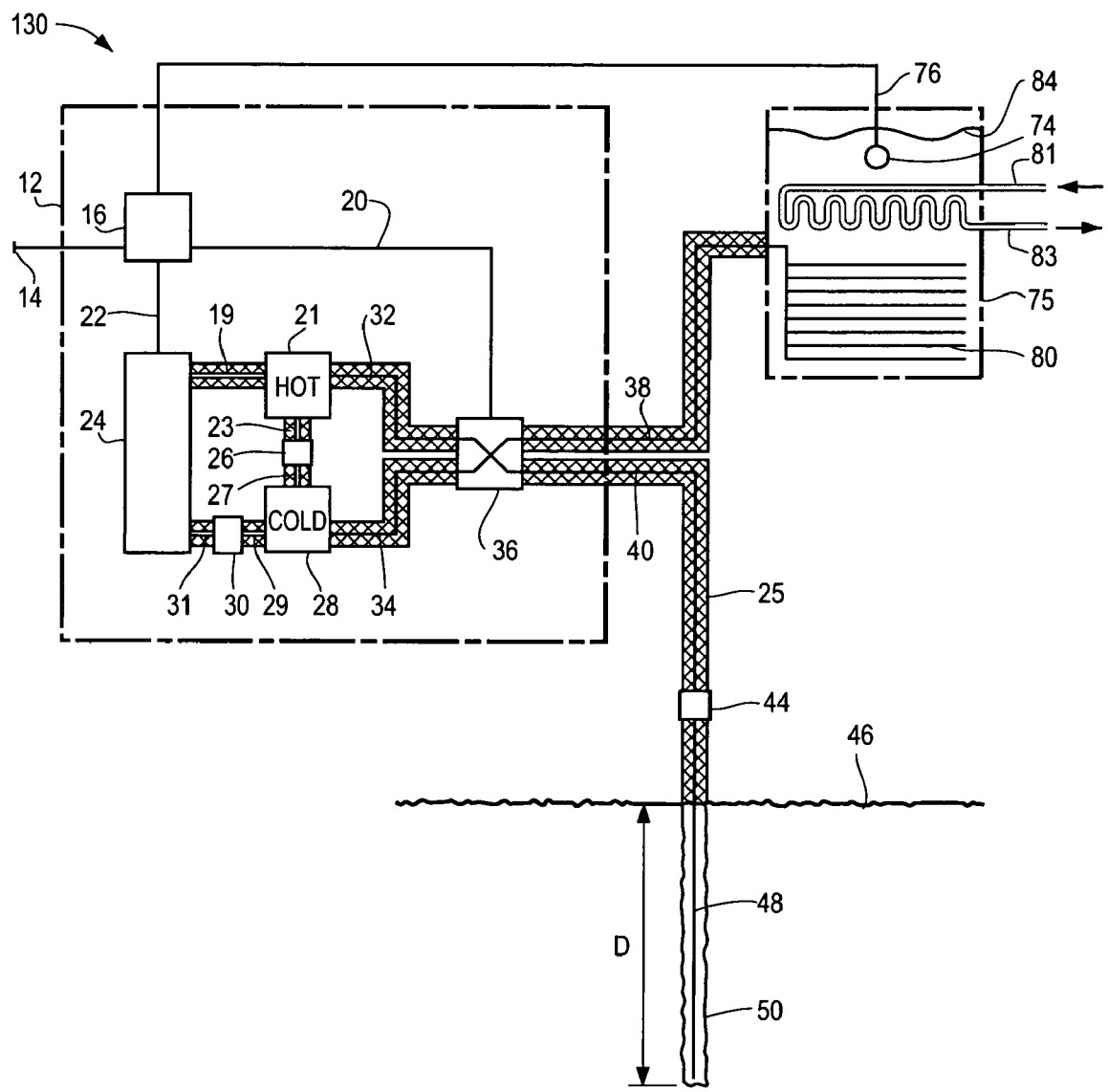

FIGS. 3a, 3b and 3c are schematic diagrams of efficient geothermal exchange systems having a thermally superconducting heat exchanger coupled to a liquid. FIG. 3a illustrates an embodiment having direct fluid contact with a superconductor. FIG. 3b illustrates an embodiment having indirect fluid thermal contact through a conduit. FIG. 3c illustrates an embodiment having indirect fluid thermal contact through an intermediate transfer fluid.

Figure 4:
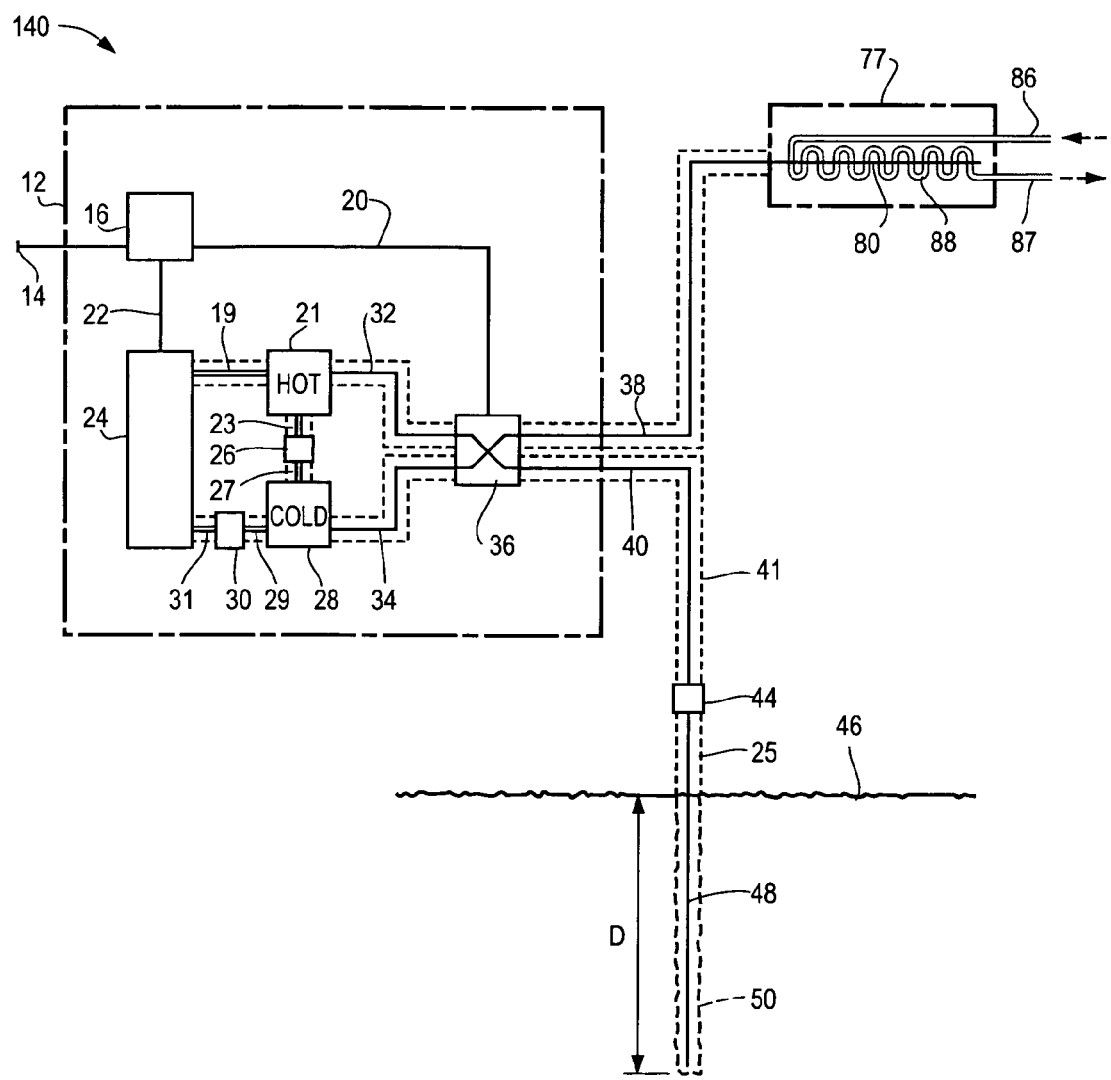

FIG. 4 is a schematic diagram of an efficient geothermal exchange system with thermal superconductor transfer having a thermally superconducting exchanger coupled to a refrigerant based secondary heat exchanger.

Figure 5:
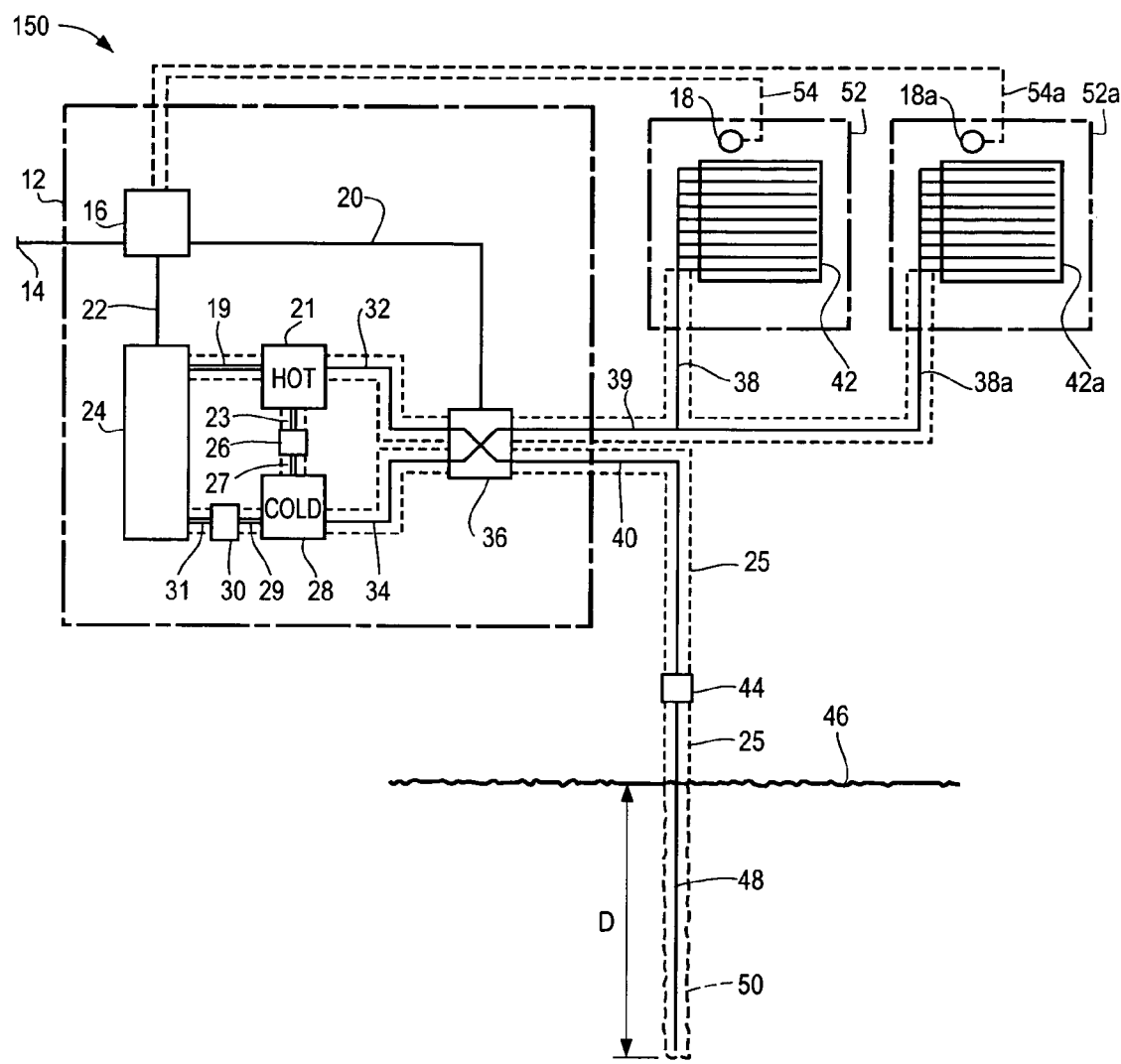

FIG. 5 is a schematic diagram of an efficient geothermal exchange system with a plurality of thermally superconducting heat exchangers.

Figure 6:
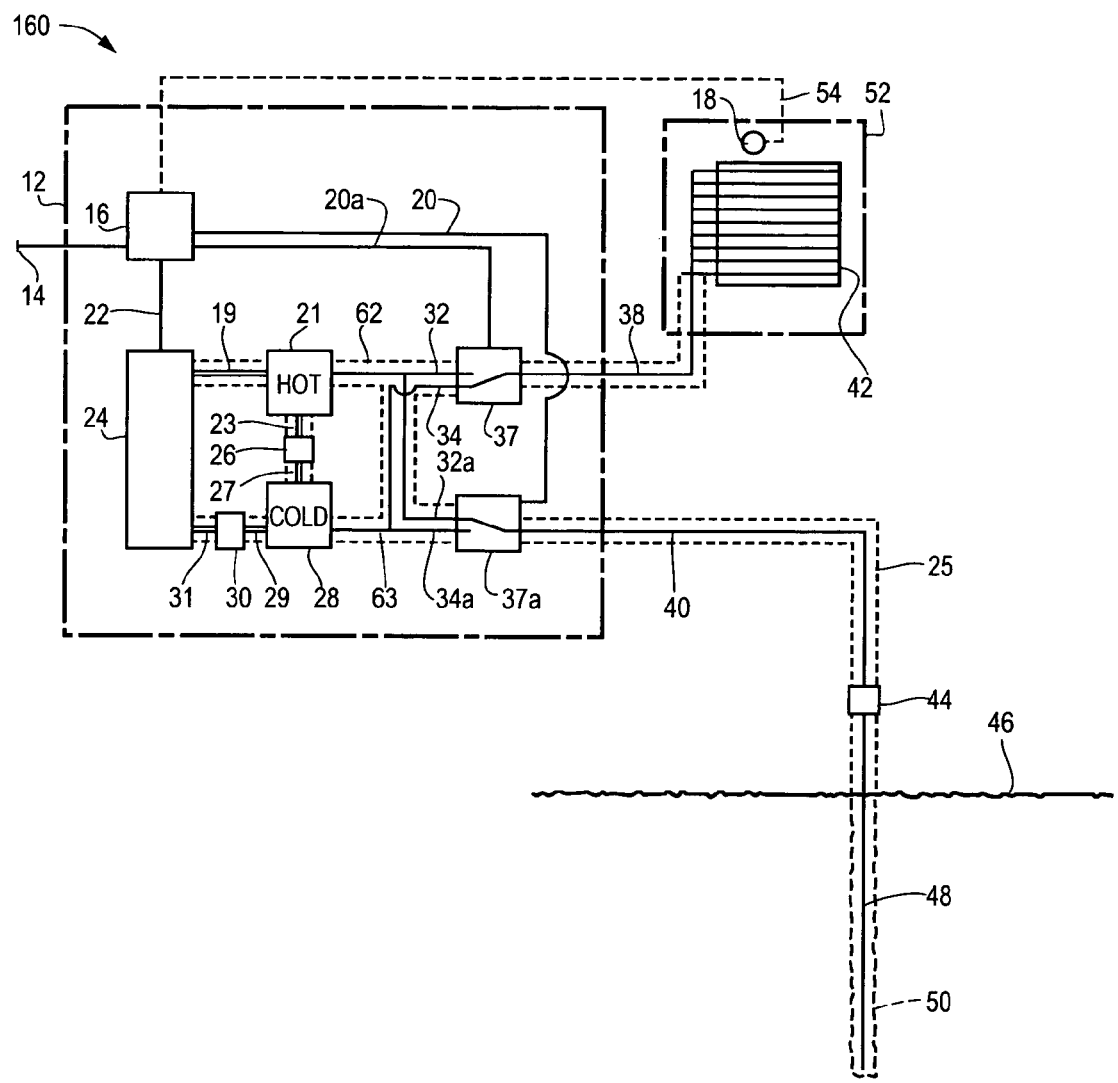

FIG. 6 is a schematic diagram of an efficient geothermal exchange system with thermal superconductor transfer elements and independent thermal transfer switches.

Figure 7:
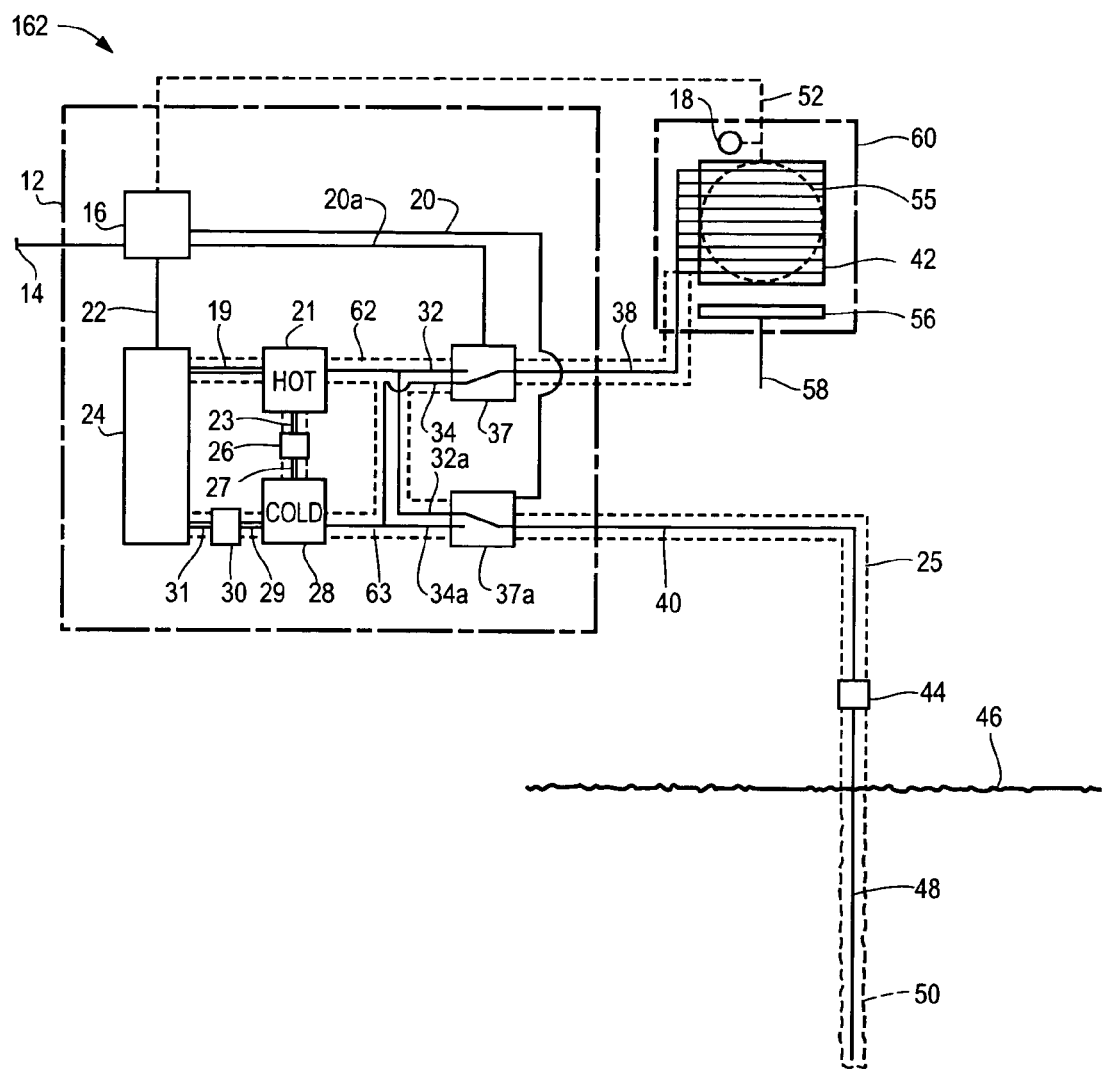

FIG. 7 is a schematic diagram of a switchable geothermal exchange system having a thermally superconducting air heat exchanger with blower.

Figure 8:
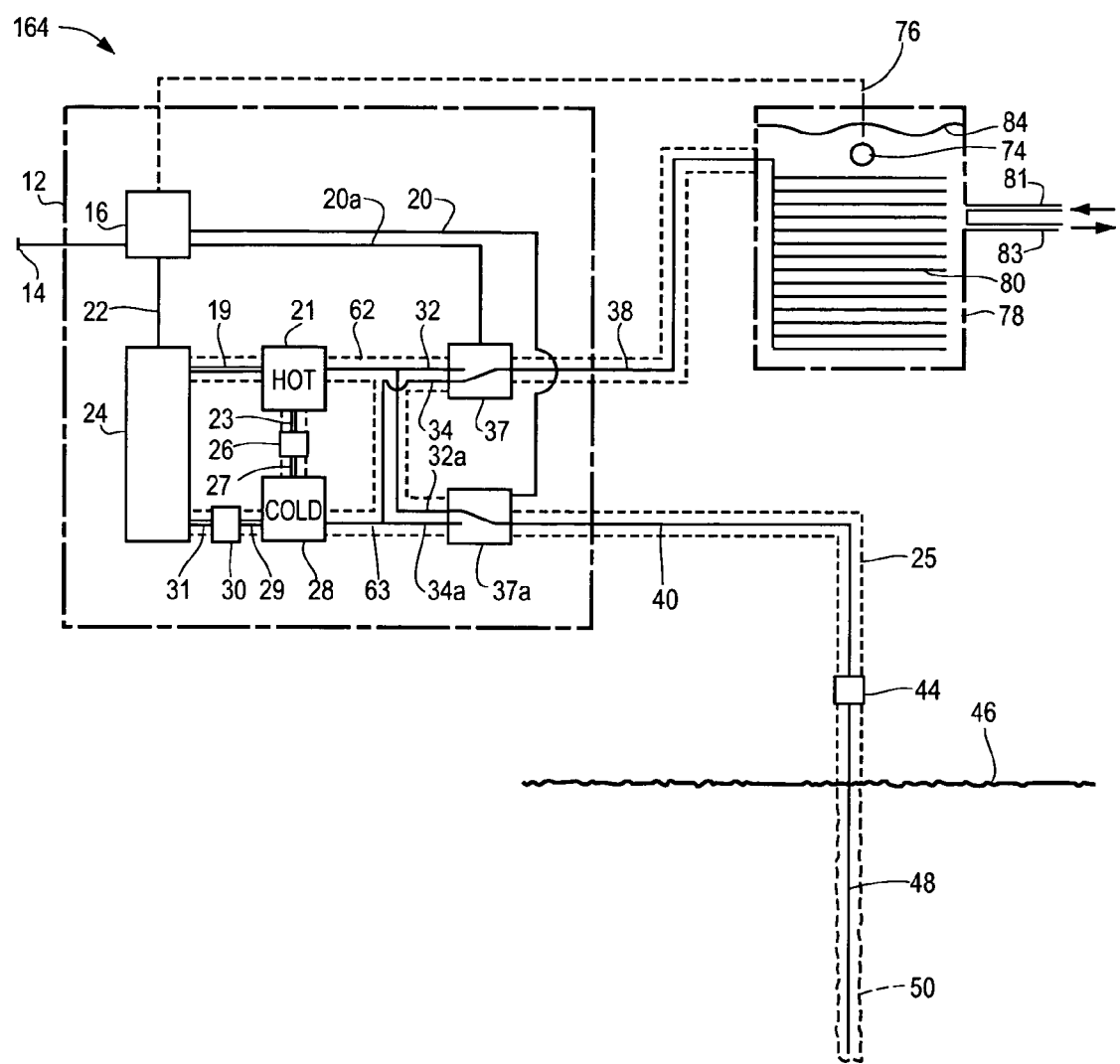

FIG. 8 is a schematic diagram of a switchable geothermal exchange system having a thermally superconducting liquid heat exchanger.

Figure 9:
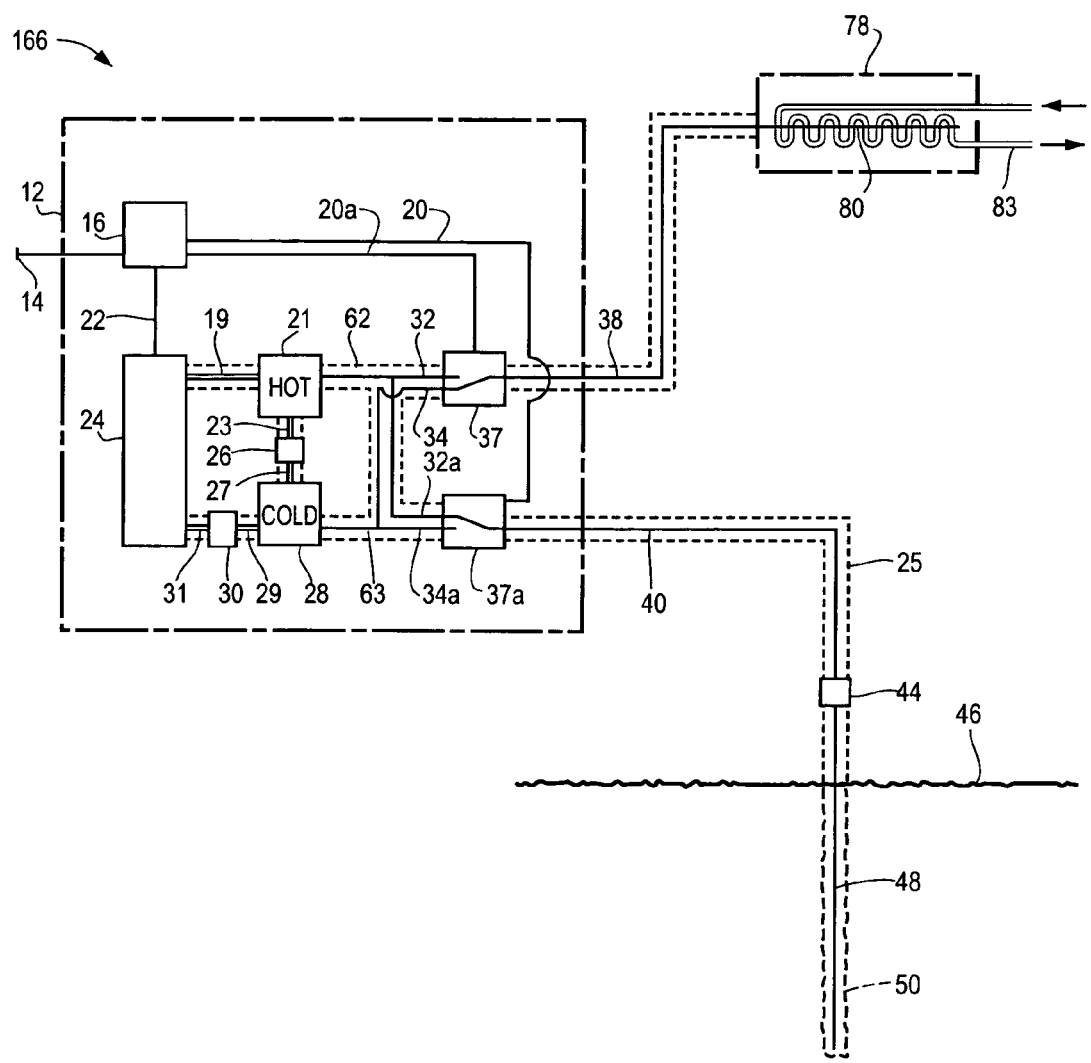

FIG. 9 is a schematic diagram of a switchable geothermal exchange system having a thermally superconducting exchanger coupled to a refrigerant based secondary heat exchanger.

Figure 10:
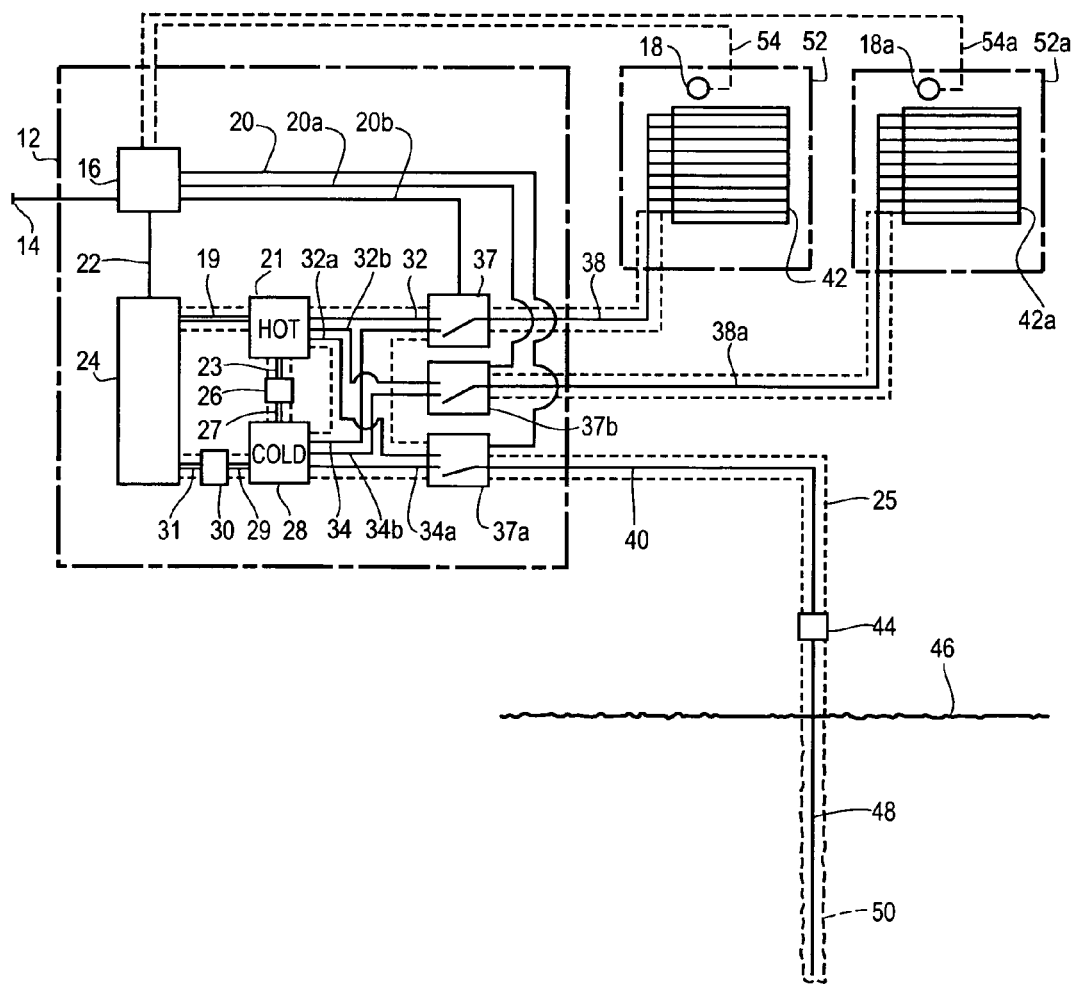

FIG. 10 is a schematic diagram of an efficient geothermal exchange system with thermal superconductor transfer elements, independent thermal transfer switches for controlling a plurality of heat exchangers.

Figure 11:
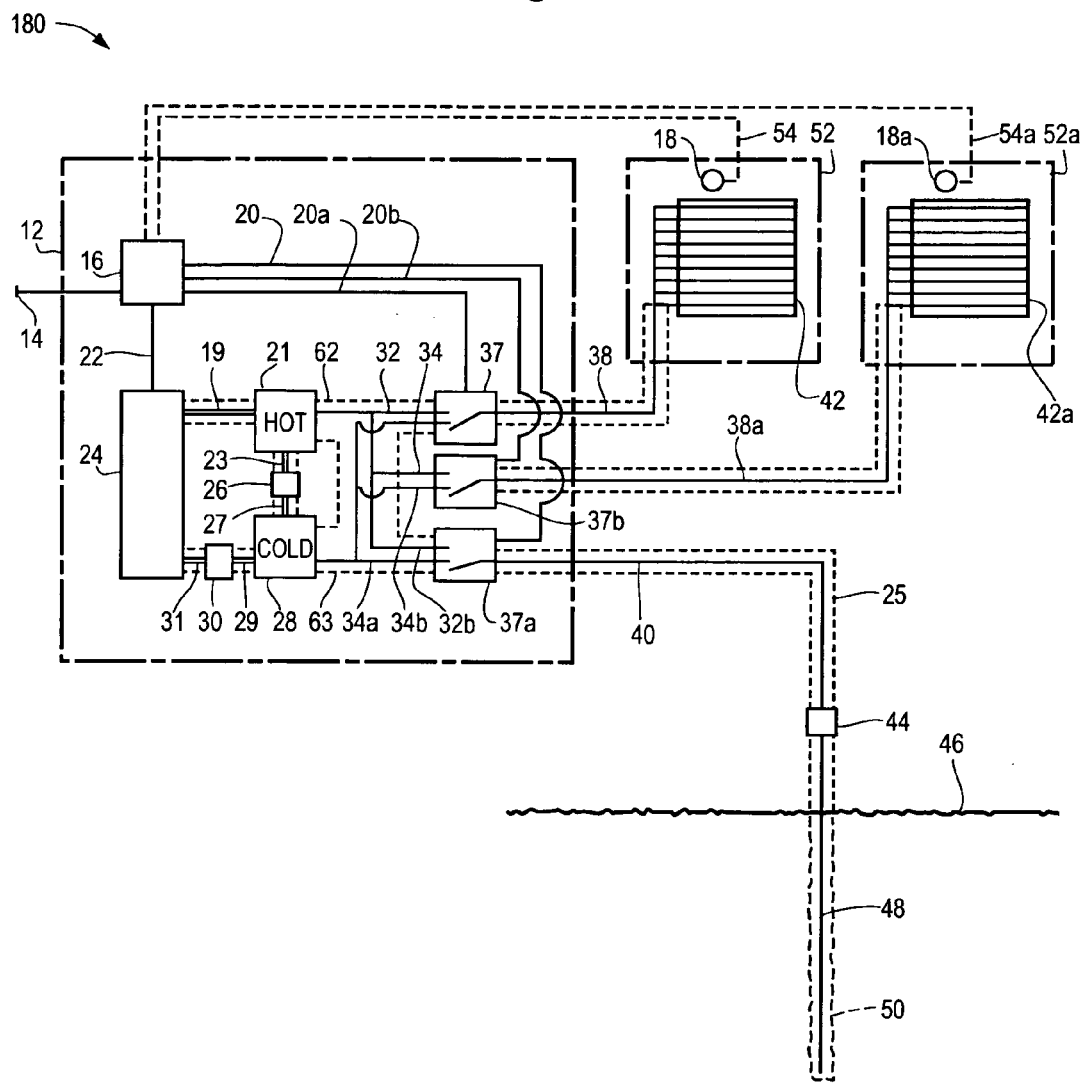

FIG. 11 is a schematic diagram of an efficient geothermal exchange system with thermal superconductor transfer elements, independent thermal transfer switches for controlling a plurality of heat exchangers coupled through a heat transfer bus.

Figure 12:
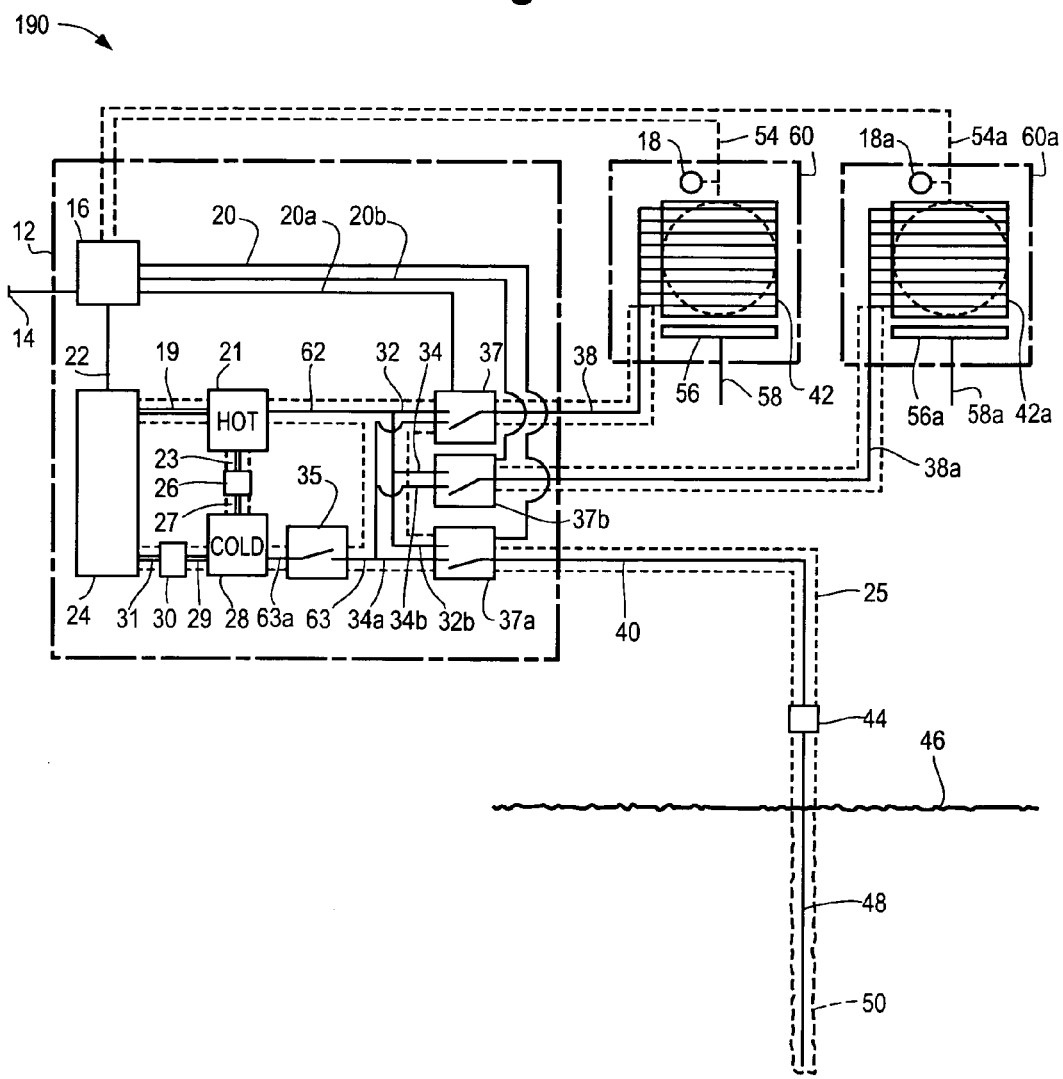

FIG. 12 is a schematic diagram of an efficient geothermal exchange system with thermal superconductor transfer elements and a plurality of switches to selectively bypass an intensifying heat exchanger.

Figure 13A:
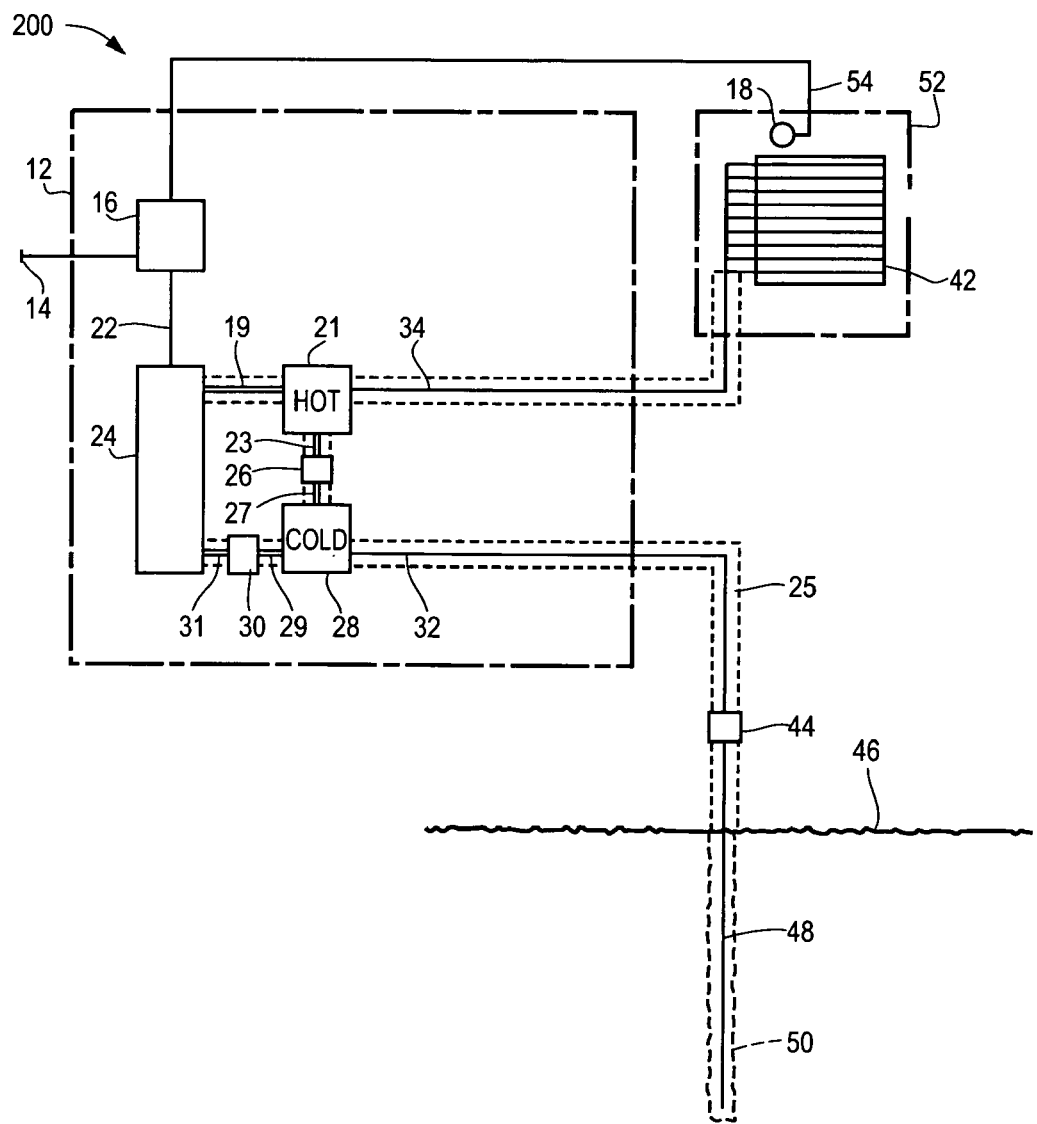
Figure 13B:
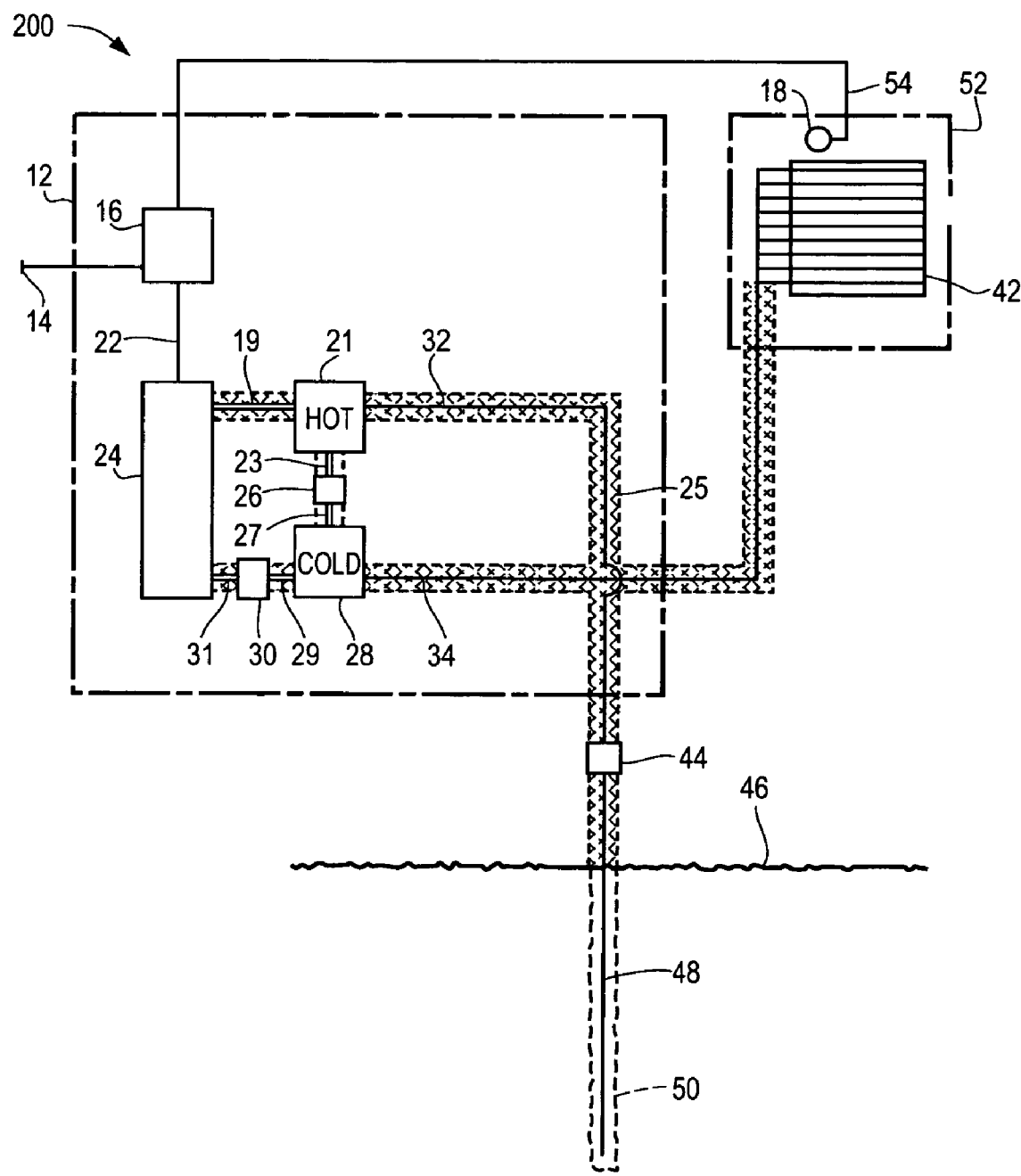

FIGS. 13a and 13b show schematics of an efficient geothermal exchange system with thermal superconductor transfer elements configured to move heat in one direction only, either to a superconductor heat exchanger (for heating; FIG. 13a) or to the ground (for cooling; FIG. 13b).

Figure 14:
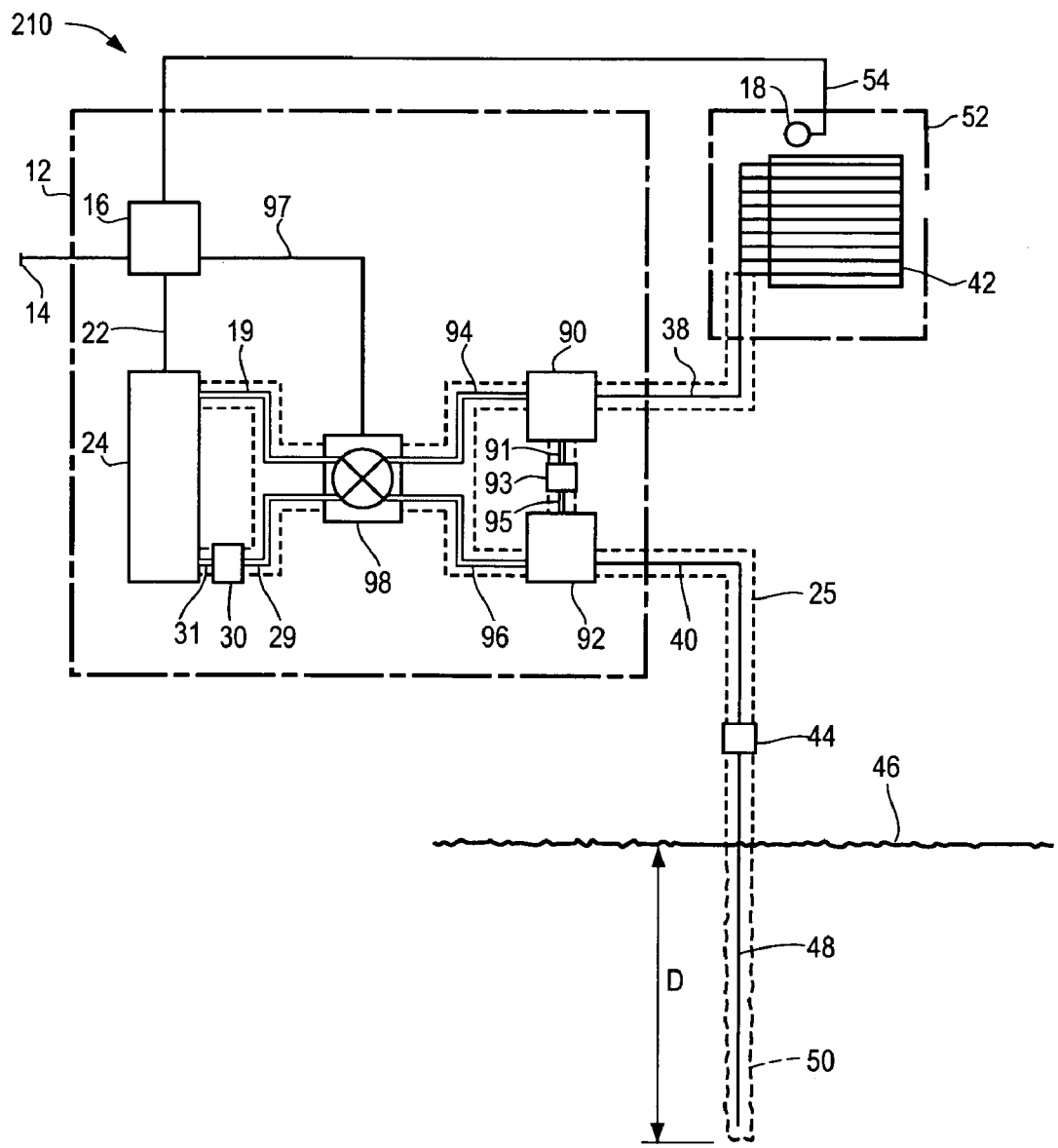

FIG. 14 is a schematic diagram of an efficient geothermal exchange system using a reversing valve in the intensifier circuit.

Figure 15:
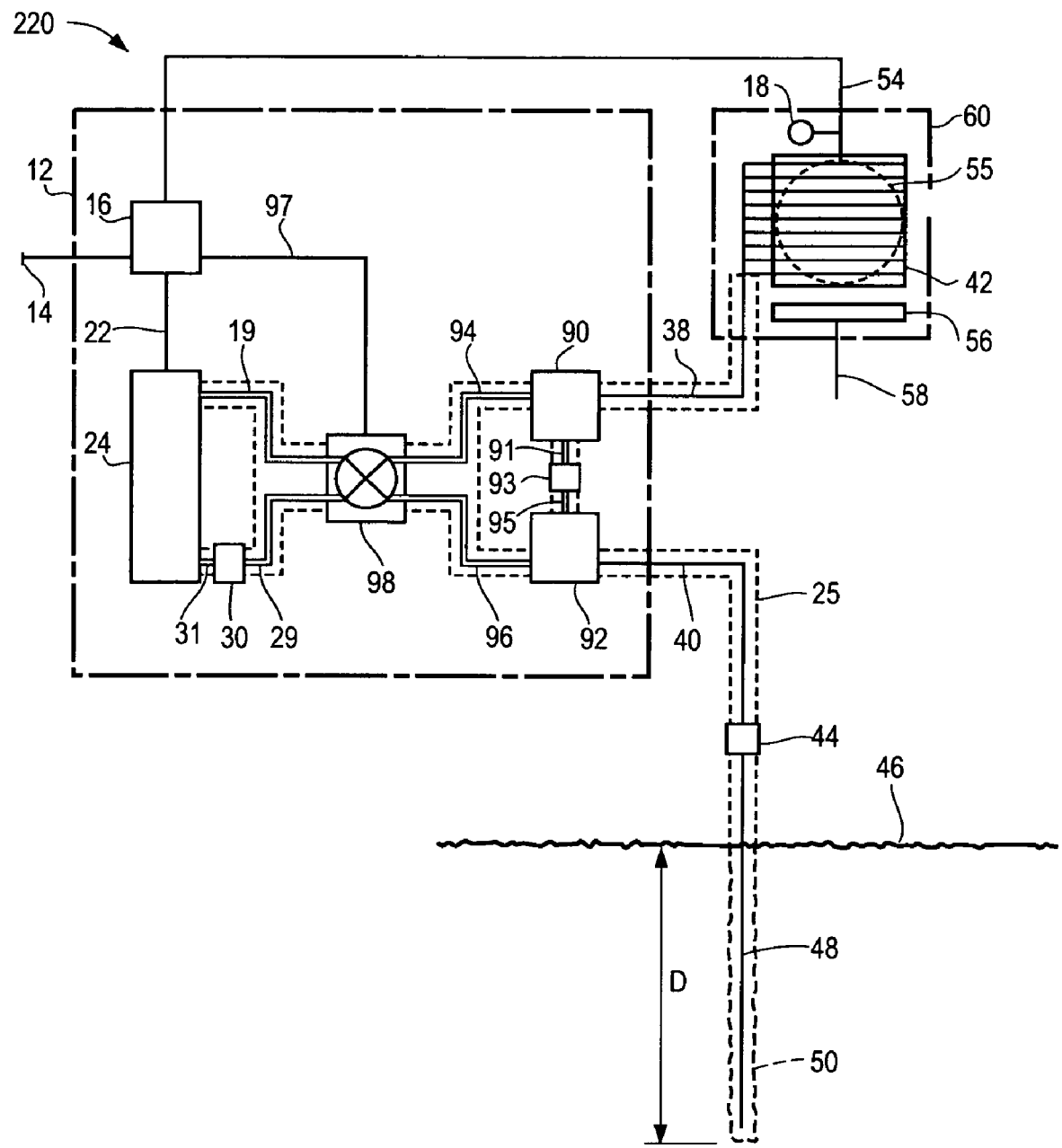

FIG. 15 is a schematic diagram of an efficient geothermal exchange system using a reversing valve in the intensifier circuit with a blower at the heat exchanger.

Figure 16:
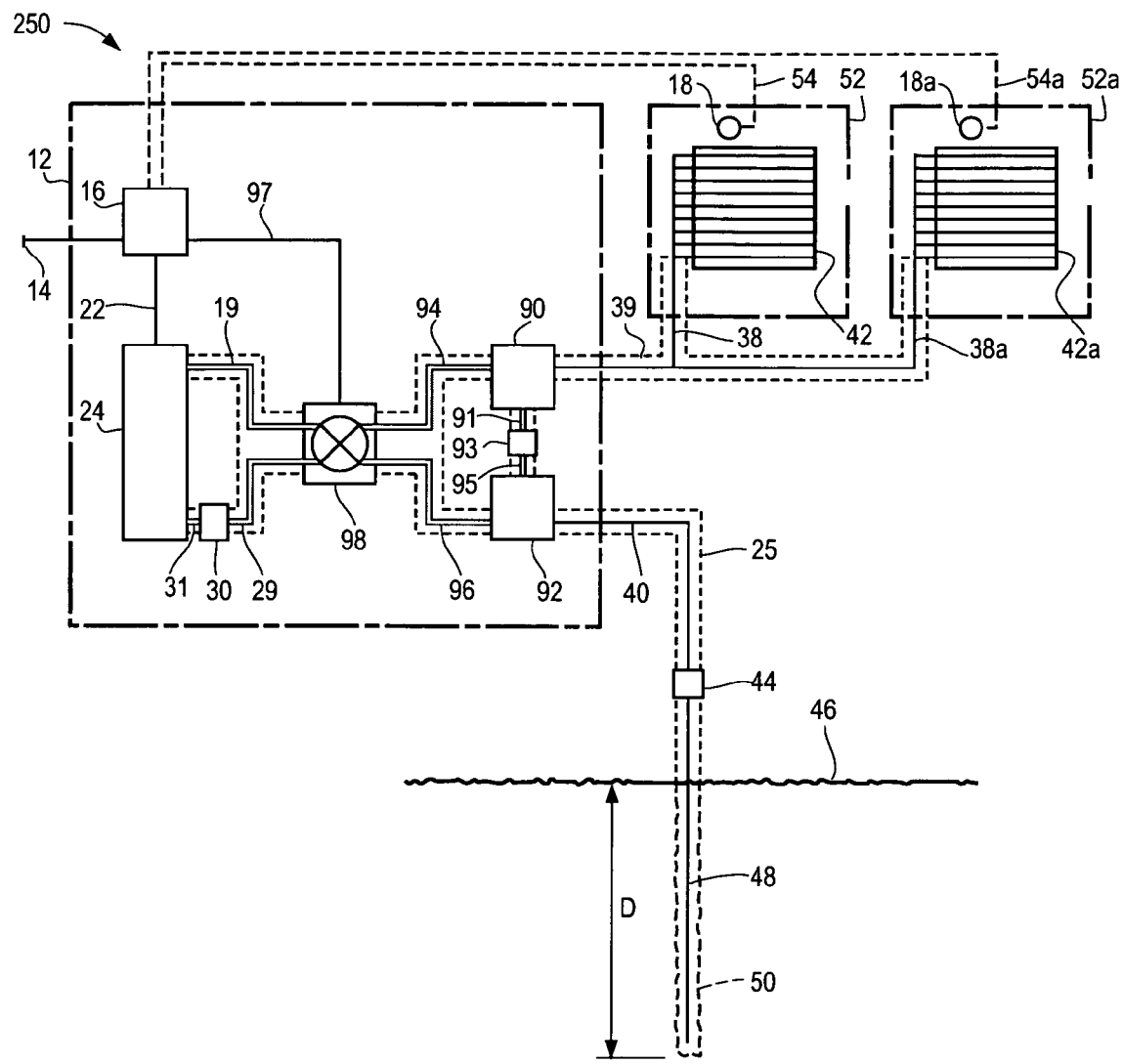

FIG. 16 is a schematic diagram of an efficient geothermal exchange system with thermal superconductor transfer elements, having a plurality of heat exchangers and a reversing valve in the intensifier circuit with a blower at the heat exchanger.

DETAILED DESCRIPTION OF PREFERRED EMBODIMENT(S)

With reference to the drawings, new and improved heating and cooling devices and geothermal exchange systems embodying the principles and concepts of the present invention will be described. In particular, the devices and systems are applicable for climate control within structures as well as more generally to bi-directional heat transfer to and from earth sources. The embodiments shown in the attached figures satisfy the need for a geothermal exchange system with improved thermal efficiency, lower installation cost and greater installation flexibility.

Recent advances in thermal superconducting materials can now be considered for use in novel energy transfer applications. For example, U.S. Pat. No. 6,132,823 and continuations thereof, discloses an example of a heat transfer medium with extremely high thermal conductivity, and is included herein by reference. Specifically the disclosed teaching indicates the orders of magnitude improvement in thermal conduction; "Experimentation has shown that a steel conduit 4 with medium 6 properly disposed therein has a thermal conductivity that is generally 20,000 times higher than the thermal conductivity of silver, and can reach under laboratory conditions a thermal conductivity that is 30,000 times higher that the thermal conductivity of silver." Such a medium can be described as thermally superconducting, and when suitably configured and enabled for geothermal exchange, its application results in many significant advantages over known systems. The available product sold by Qu Energy International Corporation is an inorganic heat transfer medium provided in a vacuum sealed heat conducting tube. Throughout the disclosure, the term superconductor shall interchangeably mean thermal superconductor.

Figure 1:
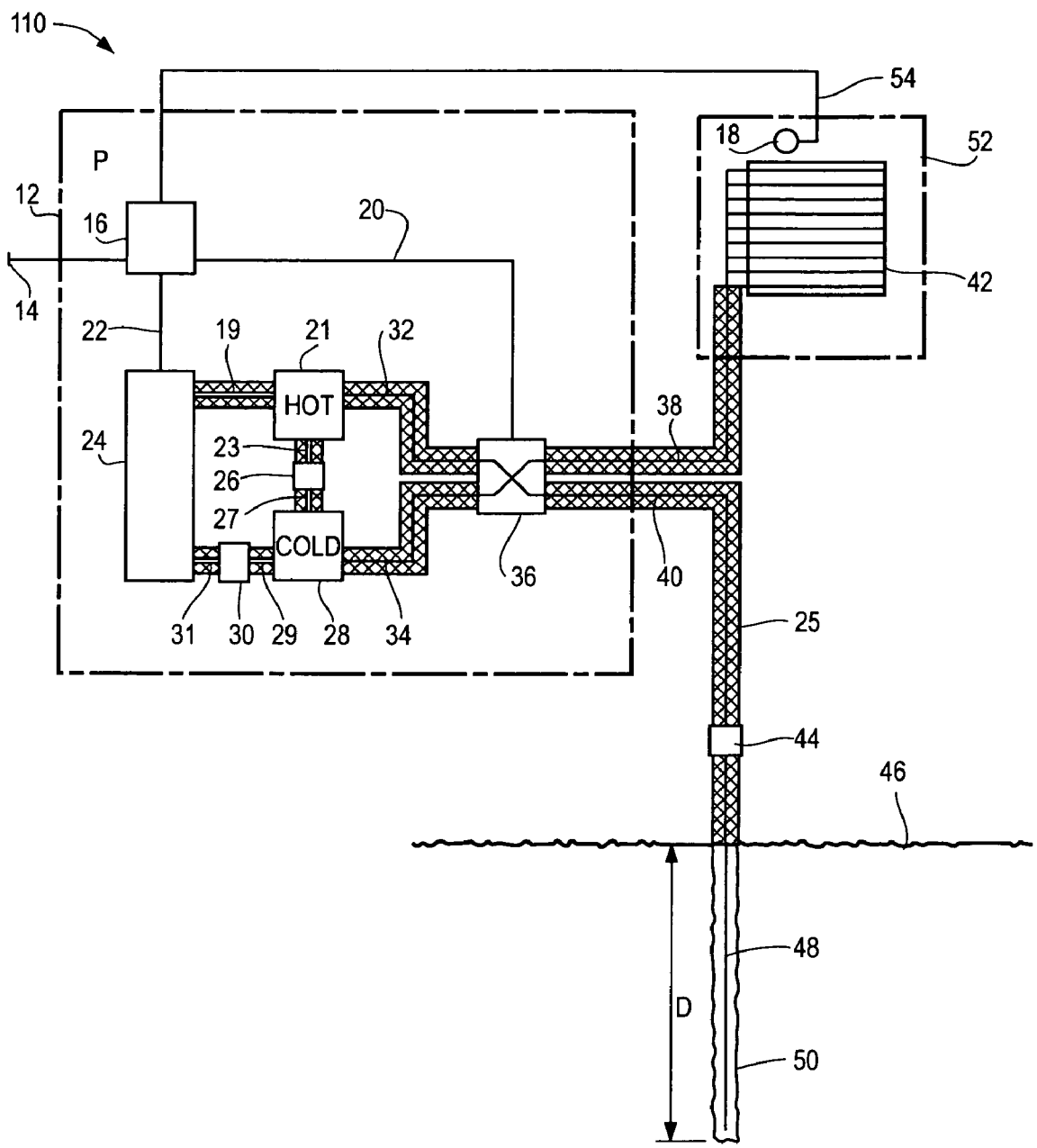
FIG. 1 is a schematic diagram of an efficient geothermal exchange system with thermal superconductor transfer coupled to a ground source.

FIG. 1 illustrates an embodiment of the invention in which heat is transferred bi-directionally using a thermal superconducting medium, such as described above. Generally, heat is transferred to and from a thermal superconductor earth source loop by a thermal superconductor heat exchange coil configured through an intensifier circuit that improves the quality of transferred heat for suitable heat transfer and with direction of heat flow controlled by a 2 way thermal switch. Specifically, superconductor geothermal exchange active components are positioned above-ground level 46 and coupleable to a geothermal ground loop 48 formed from thermal superconductor and positioned in a ground loop hole 50. The ground loop refrigerant or coolant circulating loops of conventional geoexchange systems are replaced with thermally superconducting transfer coils that are operable bi-directionally, resulting in many advantages of efficiency, reduced size, and fewer components. The ground loop thermal superconductor extends above-ground level where it is covered by insulation 25 and terminated in a coupler 44. For illustrative purposes, this superconductor may be in the form of a sealed metal tube as currently available from Qu Corporation and will be preferred to be in tube form. Alternatively other available thermal superconductors could be similarly substituted that may have various forms and cross sections such as flexible conduits, thin laminate, thin film coated metal etc, that may be suitable depending on the site and system conditions. In the preferred case, the depth of hole D is selected in combination with the thermal transfer properties of the thermal superconductor element, the thermal transfer properties of the ground around hole D and the maximum expected rate of heat transfer between the heating/cooling system and the ground, in order to provide a desired heating and cooling capacity for the system. Due to the improved thermal transfer properties of the superconductor, the hole size and depth can be considerably less than conventional geoexchange loops, saving installation costs and increasing the number of potential sites that can install geothermal exchange. As is known to those skilled in the art of conventional geothermal installations, hole 50 may equivalently be a trench in the ground 46, or alternatively the ground 46 may equivalently be a body of water such as a pond, well, river, sea or the like and the meaning of ground used herein shall include body of water. The coupler 44 couples between the ground loop superconductor 48 and a ground link superconductor segment 40 that transfers heat to and from a heat intensifier system, providing for ease of installation and conduit routing prior to connection. Optionally, the coupler may be eliminated in a direct installation design.

The superconductor segment 40 extends as one input to a 2-way thermal switch 36 (as embodied in related application, titled Thermal switch) that is connected to the superconductor segments 32 and 34. An intensifier heat circuit forms a refrigerant transfer path which includes a compressor 24 having outlet connected to refrigerant conduit 19 to a condenser heat exchanger 21 to an evaporator conduit 23 connected to a expander 26 to an evaporator heat exchanger 28 connected to a return conduit 29 and an optional accumulator 30 to a return conduit 31 to the inlet of the compressor 24. As is well known in the art, the condenser heat exchanger gives up heat and the evaporator heat exchanger absorbs heat, referred to respectively, as hot and cold intensifier exchangers, for the purpose of delivering higher grade heat. The compressor 24 compresses a gaseous refrigerant to intensify its heat content, circulates it through conduit 19 to the condenser heat exchanger 21 where it gives up heat, and then passes through conduit 23 to expander 26 which rapidly expands liquid in a pressure drop to change the refrigerant state to cooled vapor which absorbs heat at the evaporator heat exchanger 28 before passing through return conduit 29 to optional accumulator 30 (where remaining liquid is trapped and vaporized) and remaining refrigerant transfers through conduit 31 to complete the loop at the compressor inlet. When the refrigerant loop as described is filled with a suitable amount of refrigerant, the intensifier circuit is operated by turning the compressor on. This creates a temperature differential between condenser heat exchanger 21 and evaporator heat exchanger 28.

In the preferred case, the intensifier heat exchangers are isolated by insulation 25. The thermal switch functions to selectively couple the intensifier heat exchangers to superconductor ground coil 48 and a superconductor heat exchanger 52. Superconductor segment 32 is coupled to condenser heat exchanger 21 and superconductor segment 34 is coupled to evaporator heat exchanger 28. For short transfer distances, segments 32 and 34 can equivalently be a non-superconducting heat transfer medium with a resulting small loss in overall efficiency. The heat intensifier circuit is for the purpose of converting low grade heat to high quality heat such that heat is transferred at a faster rate. Any apparatus for intensifying heat can equivalently substitute for the refrigerant based heat intensifier circuit illustrated. The remaining input of the thermal switch 36 is connected to thermal superconductor transfer segment 38, which is connected to a superconductor heat exchange coil 42 within a structure. A thermal sensor 18 is associated with the medium to be conditioned by superconductor heat exchange coil 42. A controller 16 is powered by power line 14 and provides power to compressor 24 and thermal switch 36, as well as control data to and from thermal switch 36 and thermal sensor 18. Superconductor heat exchange coil 42 can be configured in any geometric arrangement within a structure to optimize heat transfer to a specific medium. Insulation 25 preferably covers superconductor transfer segments outside of coupling connections and heat exchange sections, to reduce thermal transfer losses.

The superconductor geothermal exchange system 110 is operated in either a heating or cooling mode depending on the difference between the actual measured temperature and a desired set-point programmed in the thermostatic controller 16. For example, when the desired temperature is higher than actual temperature the superconductor geothermal exchange system 110 is operated in a heating mode. In heating mode, thermal switch 36 is controlled to couple ground link superconductor 40 to cool segment 32, and superconductor transfer segment 38 to heat segment 34, while controller 16 operates compressor 24 which comprises part of a heat intensification circuit. Heat is then efficiently transferred from ground loop 48 to the intensifier circuit and intensified, then efficiently transferred through superconductor transfer segment 38 to superconductor heat exchange coil 42 for related heating use. In the cooling mode example, when the desired temperature is lower than actual temperature, thermal switch 36 is controlled to couple ground link superconductor 40 to heat segment 28 and superconductor transfer segment 38 to cool segment 34, and controller 16 operates compressor 24 which comprises part of a heat intensification circuit. Heat is then efficiently transferred from superconductor heat exchange coil 42 through superconductor transfer segment 38 to the intensifier circuit and intensified, then efficiently transferred to ground loop 48. The modes may simply switch on/off rather than oscillate between heating and cooling based on controller programming and averaging forecasting.

The intensifier circuit may have additional components as required to scale for larger energy applications. As known in the art of conventional heat pump systems, such larger systems may have receivers, suction accumulators, bulb sensors, thermostatic expansion metering valves and the like to manage refrigerant flow through the heat intensification circuit.

The superconductor geothermal exchange system 110 attached to segment 40 above coupler 44 can be enclosed a number of ways, depending on application. For example all components shown could be housed inside one enclosure, or as shown the intensifier circuit, switch and controller could be split and housed in a housing 12, and superconductor heat exchange coil 42 could be housed in a separate enclosure 52. There are three advantages to a split housing. Installation may be made easier by placing the elements coupled to the ground superconductor outside. There is an advantage to housing the noisy components such as compressor in a separate housing such that the noise level in the heating and cooling space is reduced. Finally, as the compressor produces heat while operating, there is an advantage to having it outside rather than having the extra heat reduce effectiveness of cooling the space in cooling mode. Further, the housing 12 could be located centrally in a structure, with enclosure 52 located remotely in a space to be heated or cooled. Alternatively, housing 12 could be located exterior to a structure and connected through superconductor transfer segment 38 to enclosure 52 located inside the structure to be heated or cooled.

As obvious to one skilled in the art, the coupler 44 could equivalently be alternatively positioned under the ground, above-ground outside a structure, inside a structure but outside the housing 12, or even inside the housing 12, as selected for best ease of installation. Housing 12 may include ambient vents for convective cooling of the compressor. A further embodiment of the superconductor geothermal exchange system 110 can eliminate the coupler 44 by configuring the switch to have a ground loop receptacle to accept the termination of the superconductor ground loop 48 such that the ground loop 48 can be separately installed from the rest of the system.

The advantages and efficiencies of superconductor geothermal exchange system 110 allow new improved components to be utilized. For example, a low power compressor can be used such as available from Danfoss Corporation, due to the efficiency of heat transfer enabled by the superconductors. Low power compressors are not typically suitable for geothermal heat exchange systems. In one embodiment the low power compressor can have power less than 4500 W. In an alternate embodiment the low power compressor 24 requires power less than 1800 W, making it suitable for common North American household outlets, resulting in user convenience.

The superconductor geothermal exchange system 110 may operate from conventional AC grid power, or, alternatively, from a DC power source such as a hydrogen fuel cell, a solar cell array, or a wind turbine or the like. In either AC or DC power embodiments, individual components may be AC or DC powered, with power conditioners provided as required (not shown), being delivered to the system 110 already conditioned externally or delivered requiring additional conditioning, as will be obvious to one skilled in the art. In the DC powered embodiment in which all components operate on a single voltage of DC power, low voltage alternative energy power may be used directly, without power conditioning, thereby reducing energy loss and potentially eliminating the need for power conditioning devices.

Using the preferred thermal superconducting tubes, it is preferred to have insulation along the length of all superconductor segments except heat exchanger coil segments or thermal transfer couplings to other components, to limit heat loss and condensation buildup. However alternate thermal superconductor embodiments may have integrated insulating layers or have acceptable transfer loss such that the superconductor geothermal exchange system 110 is operable.

Figure 2:
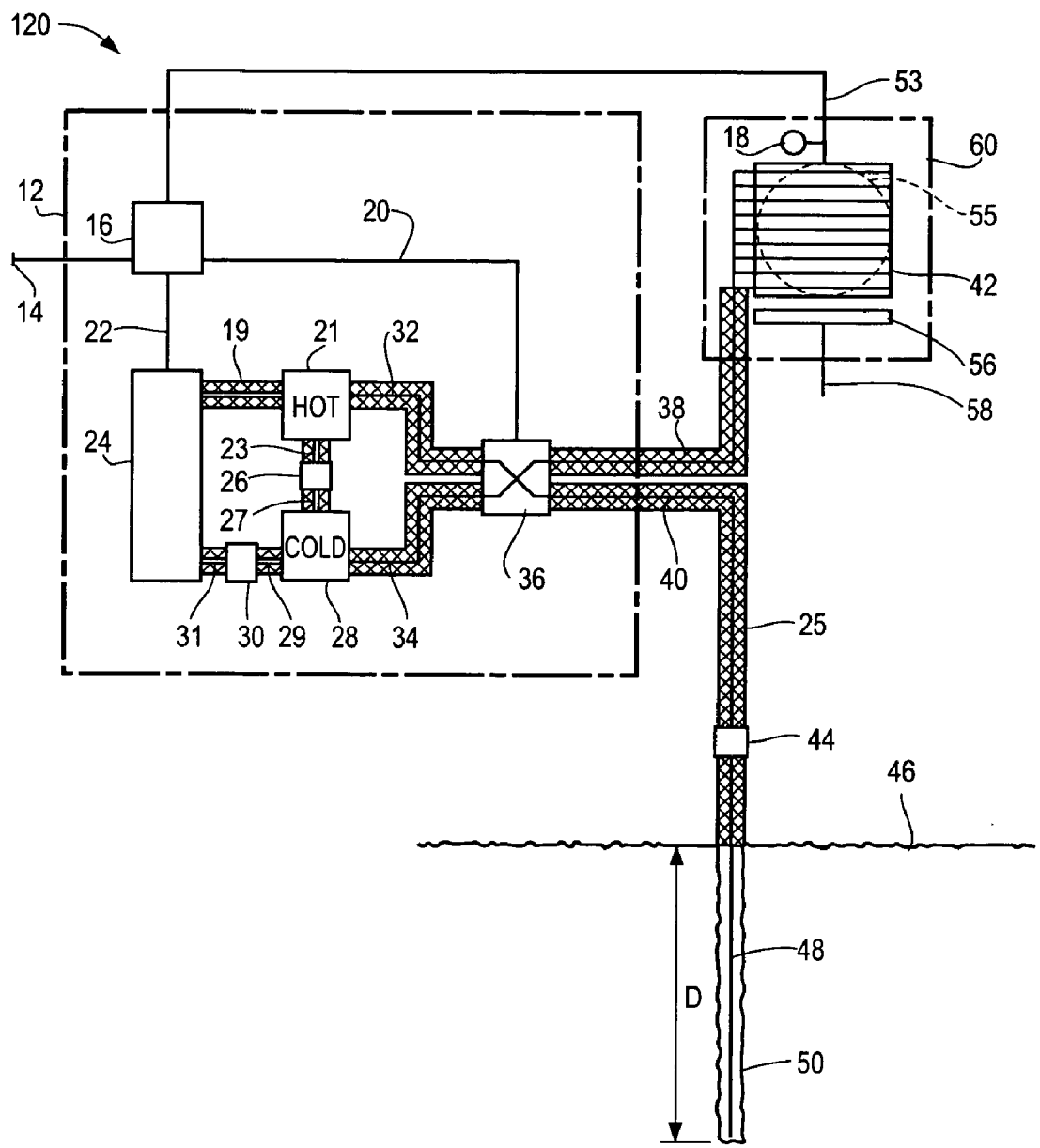
FIG. 2 is a schematic diagram of an efficient geothermal exchange system having a thermally superconducting air heat exchanger with blower.

The superconductor geothermal exchange system 110 of FIG. 1, can be configured for air heating and cooling as shown in FIG. 2. Superconductor geothermal exchange system 120 is designed for air heating and cooling inside a structure, with the following modifications and additions. Enclosure 60 has two vented regions to provide an inlet and outlet for circulated air. Between the two vented regions is a thermally superconducting air exchanger coil 42 connected or integral with the superconductor segment 38, which is further insulated by insulation 25 up to the air exchanger coil. A blower 55 is positioned in proximity to the superconducting air exchanger to pull or push air through the exchanger for cooling or heating, the preferred position being near the outlet vent region such that air is pulled over the air exchanger 42. Due to the superior heat transfer properties of the exchanger, the fan can be a low power, low throughput fan to conserve energy, or alternatively a variable speed fan. The preferred fan has operating noise less than 45 dB and can be DC powered by an alternative energy source (not shown). Superconducting air exchanger 42 may be configured in many possible designs provided sufficient net surface area is exposed to the air flow; the illustration of an array of bars substantially corresponding to the fan diameter, is a preferred example. Alternatively, as is well known in the art of air heat exchangers, metal fins could be added to the array of superconducting bars to increase the surface area of the heat exchanger. Blower 54 is connected to controller 16 and power line 14 for control of fan operation. In the cooling mode, under some ambient conditions, condensate will form on the superconductor heat exchanger 20, and an optional drip tray 56 is shown positioned below to catch condensate and an optional water drain line 58 is shown connected to drip tray for runoff disposal.

The controlled operation of the superconductor geothermal exchange system 120 is important for user comfort and control of heating and cooling. Controller 16 may be programmed as a thermostat controller responding to a temperature sensor 18 (such as a thermocouple) associated with the space to be heated cooled, or as a controller that receives input from a remote thermostat and sensor associated with the space (not shown). The controller is shown within the housing 12, but may alternatively be in any location provided it is in communication with the blower and temperature sensor. While the simplest implementation is one temperature measurement, to one skilled in the art, multiple temperature measurements could be weighted or averaged for the purpose of feedback set points in the controller 16. In the case of a multi-speed fan, alternatively a second temperature sensor could be positioned on or near the air exchanger 42 to determine the initial fan speed for faster cooling. Unlike conventional central geothermal heat pumps, which are large, noisy and require greater power than available from a standard household outlet, the air exchange subsystem in enclosure 60 can be operated from a standard power outlet, anywhere in the house, very quietly and in a small form factor housing. The housing 60 for air exchange subsystem, may be positioned anywhere within the interior room to be cooled, and does not have to be near an exterior wall or window. Preferably the housing is positioned to provide optimum air mixing and heating or cooling for the room.

Operating modes are similar as described for FIG. 1, with the additional mode of operating the blower in combination with operating the intensifying compressor for improving the rate of heat exchange with the air space to be conditioned. With the controller 16 set to a desired room temperature T1, via a manual input (not shown), or a remote control input, or a second remote thermostat (Not shown) in communication with the controller 16, the controller senses existing room temperature T2 and if higher or lower than T1, switches thermal switch 36 to create appropriate heating or cooling circuit, operates the compressor 24 to intensify the heat and operates blower 55 to circulate air until the temperature reaches T1. Alternatively, as common in the art, various thresholding or smoothing processes can be programmed to avoid jitter and determine when to switch the blower 55 on or off. In the example of a multi-speed blower, the blower speed can be programmed to change in response to the rate of change of existing temperature T2, in addition to on or off. The superconductor geothermal exchange system 120 can be programmed to operate for any input that acts as a related proxy for associated interior temperature and has a known characterized relationship to temperature.

A further embodiment of the superconductor geothermal exchange system 120 can eliminate the coupler 44 by configuring the switch to have a ground loop receptacle portion to accept the termination of the superconductor ground loop 48, such that the ground loop 48 can be separately installed from the rest of the system. It will be obvious to one skilled in the art that there are many equivalent designs to couple the ground loop superconductor to the switch including intermediate coupler segments.

The superconductor geothermal exchange systems of FIGS. 1 and 2 have many advantages that solve the problems described in the background, due to the substantial efficiency increase relative to existing geoexchange solutions. These efficiency gains result in coefficient of performance of greater than 2 and potentially as high as 5, beyond the limits of conventional geoexchange. First, the hole depth of the geothermal earth source loop can be less than conventional ground loop depth, reducing costs and increasing qualifying sites. Second, by reducing the power requirements of the compressor and eliminating ground loop circulating pumps, the power requirements of the geothermal cooling device are substantially less than conventional geothermal exchange units, whether central or for a single room, and permit the installation and operation on normal household circuits such as a 15 Ampere rated outlet. Third, the housing 10 does not require window mounting like conventional Air conditioning. Fifth, the lightweight and small size of the exchange coil housing relative to existing solutions, permits easy installation in a wide range of locations and even installations of individual exchange units in multiple rooms of a residence interior. Sixth, due to eliminating unreliable reversing valves and ground loop refrigerant and reducing moving parts, system lifetimes are extended beyond conventional geoexchange to 20 years and beyond, sufficient for permanent integration into housing structures.

The superconductor geothermal exchange system 110 of FIG. 1, can be configured for heating and cooling a liquid as shown in FIG. 3a. Superconductor geothermal exchange system 130 is designed for heating and cooling a fluid 84 for use inside a structure, with the following modifications and additions. Enclosure 78 has a thermally superconducting fluid exchanger coil 80 connected or integral with the superconductor segment 38, which is further insulated by insulation up to the fluid exchanger coil. The fluid 84 is enclosed in enclosure 78 and surrounds liquid exchanger coil 80. Exchange fluid 84 is typically in exchange with a second liquid or air source for use in heating or cooling such as floor or radiator heating or cooling, domestic water heating, extracting heat from greywater. Fluid 84 may alternatively be distributed and circulated for distributed exchange.

For the case of distributed exchange, the fluid 84 is circulated by a pump (not shown) out to a remote exchange location through outlet 83 and returned to the tank 78 through inlet 81 with resultant change in fluid temperature. For this case, the remote exchange may be fluid-to-air, fluid-to-liquid or fluid to solid thermal mass and have an associated temperature sensor 74. In this case, controller 16 is connected to operate and, optionally, power pump (not shown) in combination with operating the superconductor geothermal exchange system in heating or cooling modes as previously described. In an alternative embodiment, as shown in FIG. 3b, when a second fluid is remotely pumped and heat exchanged at the tank without heat exchange fluid transfer, no circulation of liquid 84 is required. In another alternate embodiment, as shown in FIG. 3c, a fluid is remotely circulated by a pump (not shown) through heat exchanger 77 and heat is exchanged directly between the fluid and superconducting exchanger coil 80 without the intermediation of another fluid.

The superconductor geothermal exchange system 130 of FIG. 3, can be configured for heating and cooling a fluid where the fluid is a refrigerant as shown in FIG. 4. Superconductor geothermal exchange system 140 is designed for heating and cooling a refrigerant fluid (not shown) for use inside a structure, with the following modifications and additions. Enclosure 77 has a thermally superconducting exchanger coil 80 connected or as a segment of superconductor segment 38, which is further insulated by insulation up to the fluid exchanger coil. The refrigerant is enclosed in refrigerant coil 88 directly coupled to superconductor exchanger coil 80 for heat transfer, the tube having an inlet and outlet in series within a refrigerant loop. Refrigerant fluid (not shown) is circulated by an auxiliary refrigerant system (not shown) with the distant loop end being either hot or cold depending on geothermal exchange mode. The distal loop end may heat exchange with an additional fluid or air source for use in heating or cooling such as floor or radiator heating or cooling, domestic water heating, extracting heat from greywater.

The refrigerant is circulated by a pump (not shown) out to a remote exchange location through outlet 87 and returned to the refrigerant coil 88 through inlet 86 with resultant change in fluid temperature. For this case, the remote exchange may be fluid-air or fluid-liquid and have an associated temperature sensor (not shown), and controller 16 is connected to operate and power auxiliary pump (not shown) in combination with operating the superconductor geothermal exchange system in appropriate heating or cooling modes as previously described. In an alternative embodiment, the refrigerant subsystem may have a reversing valve that is connected to controller 16 and operated to correspond to heating or cooling modes of the geothermal exchange system 140.

FIG. 5 demonstrates a multiplexed version of the superconductor geothermal exchange systems of FIGS 1-4. Thermal superconductor transfer bus 39 extends from thermal switch 36 to connect with superconductor transfer segments 38 and 38a which connect with two superconductor heat exchange coils 42 and 42a within separate enclosures 52 and 52a. As described for FIGS. 2-4, the heat exchange coil may be coupled for air exchange, fluid exchange or refrigerant exchange. In the air exchange embodiment, housings 52 and 52a respectively enclose the air exchanger coils, associated blowers (not shown), and have inlet and outlet vents (not shown in schematic view). Housing 12, encloses controller 16, power line 14, and connects to both blowers through power lines. The configuration as described allows for distributed cooling through a single thermostat, for example in a large interior space where one cooling device is unable to distribute air evenly. The cooling or heating operation would be as described previously. Alternate embodiments could have separate thermostats in each enclosure with separate set points for controlling each blower individually, or separate thermostat controller and sensor for each blower integrated into housings 52 and 52a. Optionally, one sensor 18 can be used or two sensors can be used with averaging to produce a common target.

As shown in FIG. 6, the 2 way thermal switch previously used, is now replaced by two thermal switches 34 and 34a connected to controller 16. Two state switch 34a is connected to ground-link superconductor 40 as an input, and both heat exchange segments-superconductor heat segment 34a and superconductor cool segment 32a. Two state switch 37 is connected to superconductor transfer segment 52 as an input, and both heat exchange segments as illustrated—superconductor heat segment 34 and superconductor cool segment 32. Hot superconductor transfer segments 32 and 32a are connected to hot superconductor thermal bus 62, which is connected to intensifying heat exchanger 21. Cold superconductor transfer segments 34 and 34a are connected to cold superconductor thermal bus 63, which is connected to intensifying heat exchanger 28. The switch states are coupled by controller as described below.

The operation of the two discrete switches is described for the heating and cooling modes of the superconductor geothermal exchange system 160. The superconductor geothermal exchange system 160 is operated in either a heating or cooling mode depending oil the difference between a desired setpoint programmed in the thermostat controller 16 and actual measured temperature. For example, when the desired temperature is higher than actual temperature the superconductor geothermal exchange system 160 is operated in a heating mode. In heating mode, thermal switch 37a is controlled to couple ground link superconductor 40 to cool segment 34a and thermal switch 37 is controlled to couple superconductor transfer segment 38 to heat segment 32, and controller 16 operates compressor 24 as part of a heat intensifier circuit. Heat is then efficiently transferred from ground loop 48 to the intensifier circuit and intensified, then efficiently transferred to superconductor heat exchange coil 42 through superconductor transfer segment 38 for related heating use. In the cooling mode example, when the desired temperature is lower than actual temperature the superconductor geothermal exchange system 160 is operated in a cooling mode. In cooling mode, thermal switch 37a is controlled to couple ground link superconductor 40 to heat segment 32a and thermal switch 37 is controlled to couple superconductor transfer segment 38 to cool segment 34 and controller 16 operates compressor 24 as part of a heat intensifier circuit. Heat is then efficiently transferred from superconductor heat exchange coil 52 through superconductor transfer segment 38 to the intensifier circuit and intensified, then efficiently transferred to ground loop 48 and absorbed by earth source. The modes may be controlled to simply switch individually on/off rather than oscillate between heating and cooling based on controller programming and averaging forecasting.

The superconductor geothermal exchange system 160 of FIG. 6, can be used in several exchange configurations as shown in FIGS. 7-9, corresponding to air exchange (FIG. 7), fluid exchange (FIG. 8) and refrigerant loop exchange (FIG. 9). For each, the superconductor heat exchange coil is coupled to respective mediums for designed heat transfer to and from the mediums. The operation is similar as described for the embodiment of FIG. 6, with corresponding optional modifications as suggested for the corresponding examples in FIGS. 2-4, for example placement and input from remote temperature sensors for auxiliary heating and cooling.

As shown in FIG. 10, the superconductor geothermal exchange system 160 of FIG. 6, can be extended to a plurality of superconductor heat exchange coils. Multiple superconducting heat exchangers with individual switches enable operating modes that are not available in the systems shown in FIGS. 1-9 (in which one superconductor ground loop is linked to one superconducting heat exchanger). First, individual superconducting heat exchangers can be set in opposite modes so that one heats while the other cools; this functionality is commonly required in buildings where rooms on one side exposed to the sun require cooling while rooms on the shaded side require heating. This mode has the additional benefit of greater energy efficiency, by allowing the heat produced by a superconducting heat exchanger in cooling mode to be transferred through the heat intensification circuit to a superconducting heat exchanger in heating mode. Second, different types of superconducting heat exchangers can be connected to a single system such that one or more can be used as heat sources while the remaining ones can be used as heat sinks, all at the same time. Such a system might include, for example, a grey water recovery heat exchanger operating as a heat source in addition to or in place of a ground source loop, providing heat to a superconducting heat exchanger that is heating a space in a building. This mode can be expanded to a plurality of superconductor heat exchange coils.

In FIG. 10, a plurality of superconductor heat exchange coils. 52 and 52a are each connected to independent superconductor transfer segments 38 and 38a respectively. A third thermal switch 37b is added to the existing two thermal switches of FIG.6 (37, 37a) and all three are connected to controller 16. Two state switch 37a is connected to ground-link superconductor 40 as an input, and both heat exchange segments—superconductor heat segment 32a and superconductor cool segment 34b. Two state switch 37 is connected to superconductor transfer segment 38 as an input, and both heat exchange segments as illustrated—superconductor heat segment 32 and superconductor cool segment 34. Two state switch 37b is connected to superconductor transfer segment 38a as an input, and both heat exchange segments as illustrated—superconductor heat segment 32b and superconductor cool segment 34b. The switch states are coupled by controller as described below.

The operation of the three discrete switches is described for the heating and cooling modes of the superconductor geothermal exchange system 170. The superconductor geothermal exchange system 170 is operated in either a heating or cooling mode depending on the difference between a desired setpoint programmed in the thermostat controller 16 and actual measured temperature from thermal sensor 18 or a combination of thermal sensors. For example, when the desired temperature is higher than actual temperature the superconductor geothermal exchange system 170 is operated in a heating mode. In heating mode, thermal switch 37a is controlled to couple ground link superconductor 40 to cool segment 34a and thermal switches 37 and 37b are controlled to couple superconductor transfer segments 38,38a to heat segment 32 and 32b, and controller 16 operates compressor 24 as part of a heat intensifier circuit. Heat is then efficiently transferred from ground loop 48 to the intensifier circuit and intensified, then efficiently transferred to both superconductor heat exchange coils 52, 52a through superconductor transfer segments 38, 38a for related heating use. In an alternate embodiment, only one switch of 37 or 37b couples one of superconductor transfer segments 38 or 38a to heat segment 32 or 32b. This is the minimum operable configuration for a heat exchange circuit to be completed in this mode.

In the cooling mode example, when the desired temperature is lower than actual temperature the superconductor geothermal exchange system 170 is operated in a cooling mode. In cooling mode, thermal switch 37a is controlled to couple ground link superconductor 40 to heat segment 32a and superconductor transfer segments 38,38a, to cool segment 34,34b and controller 16 operates compressor 24 as part of the heat intensifier circuit. Heat is then efficiently transferred from superconductor heat exchange coils 52, 52a through respective superconductor transfer segments 38,38a, the intensifier circuit and to ground coil superconductor 48, where it is dissipated to earth source. In an alternate embodiment, only one switch of 37 or 37b couples one of superconductor transfer segments 38 or 38a to cool segment 34 or 34b. This is the minimum operable configuration for a heat exchange circuit to be completed in this mode.

The modes may be controlled to simply switch individually on/off rather than oscillate between heating and cooling based on controller programming and averaging forecasting. The system 170 can be extended to additional switches and associated superconductor heat exchange coils configured in a similar manner.

In FIG. 10, the three switches were directly connected to both intensifying heat exchangers 21 and 28. However, in some applications requiring larger numbers of switches for larger numbers of superconductor heat exchangers, it will at some point either become difficult to connect the resulting large number of superconductors segments to heat exchangers 21 and 28, or it will become inefficient to make heat exchangers 21 and 28 in many different configurations. This limitation can be overcome by using hot and cold buses made of thermal superconductor and coupled to the intensifying heat exchanger, to which the switches can couple directly to the appropriate bus depending on operating mode. The superconductor geothermal exchange system shown in FIG. 11, illustrates hot bus 62 coupled to the intensifying heat exchanger 21, and cold bus 63 coupled to intensifying heat exchanger 28. Each switch 37,37a,37b is coupleable to either bus. Operation is identical as described for FIG. 10.

In the previous versions of the superconductor geothermal exchange systems, the intensifier subsystem is used to improve the heat quality for all operating modes. However, in some environments under some ambient conditions, the high heat-transfer efficiency of the superconductors will allow the system to provide cooling without the use of an intensification circuit simply by disconnecting all superconducting heat exchangers from the heat intensification circuit by way of a thermal switch and connecting them instead directly to the ground loop to take advantage of the differential in temperature between the ground and the air to be cooled.

In this configuration switch 35 is open and the heat intensifying circuit is turned off. Superconductor ground coil 48 and at least one of superconductor heat exchange coils 42 and 42a, are all coupled to cold superconductor bus 63 through their corresponding switches 37, 37a and 37b, and their corresponding, superconductor transfer segments 34, 34a and 34b.

In this example, the controller monitors the rate of cooling at thermal sensor 18 and 18a, and if the rate of cooling is inadequate to reach target set point, the switch 35 is closed, switch 37a is repositioned to couple with hot superconductor transfer segment 32a and the heat intensifier circuit is activated by controller 16 to provide intensified cooling. The system may switch modes depending on controller programming or user settings for efficiency or comfort.

This direct cooling functionality can also be achieved without switch 35 by having controller 16 turn off compressor 24 while switches 37, 37a,37b are all switched to cold bus 63

A special case of the superconductor geothermal exchange system 200 is shown in FIG. 13a, operable only in the heating mode. In this example, switching is not necessary and the hot superconductor transfer element 32 is directly coupled to superconductor heat exchange coil 42 while cold superconductor transfer element 34 is directly coupled to superconductor ground coil 48. Heat is transferred from the ground to superconductor ground coil 48, then to superconductor transfer element 34, through the heat intensifier circuit to transfer element 32 and then to superconductor heat exchange coil 42.

Another special case of the superconductor geothermal exchange system 200 is shown in FIG. 13b, operable only in the cooling mode. In this example, switching is not necessary and superconductor transfer element 34 is directly coupled to superconductor heat exchange coil 42 while superconductor transfer element 32 is directly coupled to superconductor ground coil 48. Heat is transferred from superconductor heat exchange coil 42 to superconductor transfer element 34, through the heat intensifier circuit to transfer element 32 and then to superconductor ground coil 48 where it is then transferred to the ground.

The embodiments shown in FIGS. 1-12 are preferred implementations for systems that both heat and cool. However, there is a key substitution that could be made that would still be improved over existing geothermal exchange systems but have fewer operating anodes with the tradeoff of using a less reliable component—a reversing valve. The systems may be modified by substituting reversing valve 98 in the intensifier circuit for all thermal switches as shown in FIG. 14, to create a reversible heat intensifying loop as is well known in the art. In this embodiment, refrigerant vapor is compressed by compressor 24 and then flows through conduit 19. Reversing valve 98, controlled by controller 16 through control line 97, then directs this vapor to either heat exchanger 90 or 92, according to whether heating or cooling is required.

The embodiments shown in FIGS. 1-12 are preferred implementations for systems that both heat and cool. However, there is a key substitution that could be made that would still be improved over existing geothermal exchange systems but have fewer operating modes with the tradeoff of using a less reliable component—a reversing valve. The systems may be modified by substituting reversing valve 98 in the intensifier circuit for all thermal switches as shown in FIG. 14, to create a reversible heat intensifying loop as is well known in the art. In this embodiment, refrigerant vapor is compressed by compressor 24 and then flows through conduit 19. Reversing valve 98, controlled by controller 16 through control line 97, then directs this vapor to either heat exchanger 90 or 92, according to whether heating or cooling is required. As in previous embodiments, superconductor heat transfer segment 38 and superconductor transfer segment 40 are each thermally coupled to one of the heat exchangers, with one configuration being as shown in FIG. 14.

If heating is required, controller 16 sends an instruction to reversing valve 98 to actuate to a position such that heated compressed refrigerant is transferred from conduit 19 to conduit 94. The refrigerant then flows to heat exchanger 90, which functions as a condensing heat exchanger. Heat exchanger 90 gives up heat to superconducting heat transfer segment 38, which transfers it to superconducting heat exchanger 42. The refrigerant gas flowing through heat exchanger 90 condenses in the process to form a liquid or partial liquid which is transferred through conduit 91 to bi-directional expansion element 93 which causes liquid refrigerant to vaporize through expansion, the refrigerant becoming cold before flowing through conduit 95 to heat exchanger 92, where it absorbs heat from superconducting transfer segment 40 which transfers heat from superconducting ground coil 48. The heated refrigerant gas then passes through conduit 96 and then through reversing valve 98 which in the selected position for this mode, transfers it through conduit 29 to optional accumulator 30 which traps and then allows to vaporize any remaining liquid refrigerant before the refrigerant vapor returns through conduit 31 to compressor 24 to begin the heat intensification cycle again.

If cooling is required, controller 16 sends an instruction to reversing valve 98 to actuate to a position such that heated compressed refrigerant is transferred from conduit 19 to conduit 96. The refrigerant is then transferred to heat exchanger 92 which then functions as the condensing heat exchanger. Heat exchanger 92 gives up heat to superconductor heat transfer segment 40, which transfers heat to superconducting ground loop 48 which transfers it to the ground. The refrigerant gas flowing through heat exchanger 92 condenses in the process and forms a liquid or partial liquid which is transferred through conduit 95 to bi-directional expansion element 93 which causes liquid refrigerant to vaporize through expansion, the refrigerant becoming cold before flowing through conduit 91 to heat exchanger 90, where it absorbs heat from superconducting transfer segment 38 connected to superconducting heat exchanger 42. The heated refrigerant vapor then passes through conduit 94 and then through reversing valve 98 which in the selected position for this mode, transfers it through conduit 29 to optional accumulator 30 which traps and then allows to vaporize any remaining liquid refrigerant before the refrigerant vapor returns through conduit 31 to compressor 24 to begin the heat intensification cycle again.

The embodiment of FIG. 14 provides basic operational modes of heating and cooling. However, because superconducting heat exchanger 52 and superconductor ground loop 48 are coupled through superconductor transfer segments 38 and 40 (respectively) directly to heat exchangers 90 and 92, without the thermal switches or thermal transfer buses shown in FIGS. 1-12, the other operating modes described for FIGS. 1-12 are not enabled in the embodiment of FIG. 14.

In FIG. 15, a special case of the superconductor geothermal exchange system of FIG. 14 is shown. The superconductor heat exchange coil 42 is configured for air exchange with the addition of blower 55 to circulate air over the coil for improved air heat transfer. Blower 55 is connected to controller 16 and may be powered through controller 16 or independently.

A special case of the superconductor geothermal exchange system of FIG. 14, is adding a plurality of superconductor heat exchange coils coupled to a common superconductor transfer element 39 coupled to heat exchanger 90, with the superconductor ground coil 48 coupled to heat exchanger 92 through above-ground segment 40.

Throughout these examples and embodiments described, insulation has been shown on superconductor segments designed for low thermal loss transfer (that is, not the ends of the superconductor segments), and is the preferred example, whether or not explicitly stated in figure descriptions or numbered on drawings. However, as noted previously, the superconductor geothermal exchange systems described will operate with no insulation or with some transfer lines insulated or any combination of insulated or uninsulated portions of the superconductors thereof.

Throughout these examples housing has been described as split housing in a preferred case, however it will be appreciated that the various embodiments can be integrated into existing structures or enclosed in a single housing.

What is claimed is:

1. A superconductor geothermal exchange system having a plurality of thermal superconductors coupleable to at least one outside ground coil formed from a thermal superconductor material and extending below ground level to allow passive thermal conduction between an earth source and an above-ground thermal superconductor segment, the system comprising:

(a) an intensifying heat exchanger comprising:
(1) a refrigerant coil receiving refrigerant in a heating and cooling cycle, said refrigerant coil having a condenser heat exchange segment and an evaporator heat exchange segment;
(2) an evaporator for expanding liquid refrigerant to a vaporous state, said evaporator located between said condenser heat exchange segment and said evaporator heat exchange segment;
(3) a compressor for compressing and circulating refrigerant in said refrigerant coil;

(b) a heat exchange coil formed from thermal superconductor material, said heat exchange coil having a transfer segment comprising, at opposite ends, a first thermal superconductor exchange segment and a second thermal superconductor exchange segment;

(c) a ground coil thermal switch thermally coupleable to said condenser and evaporator heat exchange segments and said above-ground thermal superconductor exchange segment, such that in a first switch position said above-ground thermal superconductor exchange segment is thermally coupled to said condenser heat exchange segment to operate in a cooling mode, and in a second switch position said above-ground thermal superconductor exchange segment is thermally coupled to said evaporator heat exchange segment to operate in a heating mode;

(d) a heat exchange thermal switch thermally coupleable to said condenser and evaporator heat exchange segments and said second thermal superconductor exchange segment, such that in a first switch position said second thermal superconductor exchange segment is thermally coupled to said evaporator heat exchange segment to operate in a cooling mode, and in a second switch position said second thermal superconductor exchange segment is thermally coupled to said condenser heat exchange segment to operate in a heating mode;

(e) a thermostat controller associated with an indoor space, said thermostat controller programmable with a desired set point temperature, said thermostat controller electrically connected to a thermal sensor for measuring said indoor space temperature, said thermostat controller electrically connected to said heat exchange thermal switch, said ground coil thermal switch and said compressor;

whereby said ground coil thermal switch and said heat exchange thermal switch place the system in one of said heating and cooling modes, and said switch positions are selected in response to a calculated difference between said set point temperature and said measured temperature, said controller actuating said compressor in response to said calculated difference.

2. The superconductor geothermal exchange system of claim 1, further comprising a plurality of thermal superconductor heat exchange coils coupled to a plurality of associated heat exchange thermal switches coupled to said condenser and evaporator heat exchange segments, said heat exchange thermal switches independently connected to said thermostat controller, wherein at least one of said heat exchange thermal switches is thermally coupled to the exchange segment opposing the ground coil coupled exchange segment and the remainder of said heat exchange thermal switches are independently switchable, and set point temperatures associated with each heat exchange coil are programmable in said thermostat controller, thereby providing independently controlled heating and cooling of said plurality of coils.

3. The superconductor geothermal exchange system of claim 2, further comprising a plurality of temperature measuring devices associated with said plurality of heat exchange coils to provide independent temperature measurements, and said plurality of heat exchange switches are switchable in response to respective calculated differences between said individual measured temperatures and corresponding set point temperatures.

4. The superconductor geothermal exchange system of claim 2, further comprising a plurality of blowers positioned proximal to each of said heat exchange coils and electrically connected to said controller, such that each blower is actuateable in response to respective calculated differences between said temperature measurements and associated set point temperatures.

5. The superconductor geothermal exchange system of claim 1, further comprising a plurality of thermal superconductor heat exchange coils and a plurality of associated heat exchange thermal switches coupled to a pair of thermal superconductor heat transfer buses, said heat transfer buses coupled, respectively, to said condenser and evaporator heat exchange segments, said heat transfer buses thermally connected, respectively, to said plurality of associated heat exchange thermal switches, wherein at least one of said heat exchange thermal switches is thermally coupled to the exchange segment opposing the ground coil coupled exchange segment and the remainder of said heat exchange thermal switches are independently switchable, thereby operating in independent heating and cooling modes at different locations in said indoor space.

6. The superconductor geothermal exchange system of claim 1, further comprising at least one outside ground coil formed from a thermal superconductor material, said at least one outside ground coil extending below ground level allowing passive thermal conduction to the earth source, said at least one outside ground coil having an above-ground thermal superconductor exchange segment.

7. The superconductor geothermal exchange system of claim 6, wherein system coefficient of performance is greater than 2.0.

8. The superconductor geothermal exchange system of claim 1, wherein said thermal superconductor material is an inorganic heat transfer medium.

9. The superconductor geothermal exchange system of claim 8, wherein said heat transfer medium is disposed in a sealed heat transfer pipe.

10. The superconductor geothermal exchange system of claim 9, wherein said thermal superconductor material is disposed in heat transfer pipes, each of said heat transfer pipes insulated along at least a portion thereof, said heat transfer pipes having thermal conductivity greater than 100 times elemental silver thermal conductivity and having substantially negligible heat loss along said thermal superconductor segment.

11. The superconductor geothermal exchange system of claim 1, wherein said compressor is operable at consumed power less than 4500 W.

12. The superconductor geothermal exchange system of claim 11, wherein said compressor is operable at consumed power less than 1800 W.

13. The superconductor geothermal exchange system of claim 1, further comprising a power adapter connected to said compressor and said controller.

14. The superconductor geothermal exchange system of claim 13, wherein said power adapter is a power converter coupleable to an alternative energy source selected from the group consisting of a photovoltaic array, a wind generator and a fuel cell.

15. The superconductor geothermal exchange system of claim 12, wherein said power adapter is a power converter for converting AC power to DC power, said DC power supplied to said compressor.

16. The superconductor geothermal exchange system of claim 13, wherein said power converter comprises a power conditioning circuit for converting unconditioned electric power from an alternative energy source to conditioned electric power suitable to operate said compressor.

17. The superconductor geothermal exchange system of claim 1, wherein said ground coil thermal switch and said heat exchange switch comprise heat transfer components formed of thermal superconductor material.

18. The superconductor geothermal exchange system of claim 1, wherein at least a portion of said thermal superconductor material is formed in discrete segments connected by thermally conducting joiners.

19. The superconductor geothermal exchange system of claim 5, wherein at least a portion of said thermal superconductor material is formed in discrete segments connected by substantially thermally conducting joiners.

20. The superconductor geothermal exchange system of claim 2, further comprising a coupler separating said above-ground thermal superconductor segment into two thermally coupled segments.

21. The superconductor geothermal exchange system of claim 1, further comprising a blower positioned proximal to said first thermal superconductor exchange segment of said heat exchange coil, and wherein said controller is electrically connected to said blower to actuate said blower in response to a calculated difference between said measured temperature and said set point temperature.

22. The superconductor geothermal exchange system of claim 21, wherein said first thermal superconductor exchange segment is arranged as a condenser array with area substantially corresponding to said blower area, thereby increasing heat exchange with air.

23. The superconductor geothermal exchange system of claim 1, further comprising an auxiliary heat exchange fluid circulation loop thermally coupled to said first thermal superconductor exchange segment, said loop comprising a fluid circulation device.

24. The superconductor geothermal exchange system of claim 23, wherein said heat exchange fluid is water and said fluid circulating device is a water pump.

25. The superconductor geothermal exchange system of claim 23, wherein said auxiliary heat exchange fluid circulation loop supplies heat to a surface of said space.

26. The superconductor geothermal exchange system of claim 23, wherein said auxiliary heat exchange fluid circulation loop supplies heat to potable water.

27. The superconductor geothermal exchange system of claim 23, wherein said auxiliary heat exchange fluid circulation loop recovers heat from wastewater.

28. The superconductor geothermal exchange system of claim 23, wherein said heat exchange fluid is a refrigerant and said fluid circulation device comprises a compressor and an evaporator.

29. The superconductor geothermal exchange system of claim 28, wherein said heat exchange fluid is directed to a refrigerator.

30. The superconductor geothermal exchange system of claim 1, further comprising a wireless signal receiver electrically connected to said thermostat controller and a remote control device for transmitting wireless signals to said receiver, said set point temperature programmable from said remote control device.

31. The superconductor geothermal exchange system of claim 1, wherein a segment of said heat exchange coil is arranged as a thermal conductor bus thermally coupled to a plurality of said first thermal superconductor segments.

32. The superconductor geothermal exchange system of claim 31, further comprising a plurality of blowers positioned proximal to each of said first thermal superconductor exchange segments and electrically connected to said controller, whereby a plurality of heat exchanges can occur at a plurality of locations in said space.

33. The superconductor geothermal exchange system of claim 32, further comprising a plurality of thermal sensors associated with said plurality of locations and electrically connected to said controller.

34. The superconductor geothermal exchange system of claim 21, further comprising:
(i) a first enclosure for housing said power supply, said controller, said intensifying heat exchanger and said ground coil thermal switch; and said heat exchange thermal switch;
(ii) a second enclosure for housing said first thermal superconductor exchange segment, a blower positioned proximal to said first thermal superconductor exchange segment, said second enclosure having at least one vent in fluid communication with said blower, wherein said first enclosure has openings formed therein such that said ground thermal switch is thermally coupleable to said above-ground thermal superconductor segment, and wherein said first enclosure and said second enclosure are thermally connected by at least said second thermal superconductor exchange segment and an electrically connected control line to said blower.

35. The superconductor geothermal exchange system of claim 34, wherein said controller is electrically connected to said blower.

36. The superconductor geothermal exchange system of claim 34, wherein operating noise from said second enclosure is less than 45 dB during in said heating and cooling modes.

37. The superconductor geothermal exchange system of claim 32, further comprising:
(i) a first enclosure for housing said power supply, said controller, said intensifying heat exchanger and said ground coil thermal switch; and said heat exchange thermal switch;
(ii) a second enclosure for housing said first thermal superconductor exchange segment, a blower positioned proximal to said first thermal superconductor exchange segment, said second enclosure having at least one vent in fluid communication with said blower, wherein said first enclosure has openings formed therein such that said ground thermal switch is thermally coupleable to said above-ground thermal superconductor segment, and wherein said first enclosure and said second enclosure are thermally connected by at least said second thermal superconductor exchange segment and electrically connected by a control line to said blower.

38. The superconductor geothermal exchange system of claim 1, further comprising a pair of thermal superconductor heat distribution transfer buses thermally coupled, respectively, to said condenser heat exchange segment and said evaporator heat exchange segment, said heat distribution transfer buses thermally connectable to said thermal switches.

39. The superconductor geothermal exchange system of claim 38, further comprising a superconductor earth source bypass thermal switch thermally connected in series between said ground coil thermal switch and said intensifying heat exchanger such that when said earth source bypass thermal switch is disconnected, said heat exchange thermal switch and said ground coil thermal switch are switched to a common thermal transfer bus such that heat is transferred directly from said heat exchange coil to said ground coil through said heat bus and said switches.

40. The superconductor geothermal exchange system of claim 39, wherein at least a portion of said thermal superconductors are formed in discrete segments connected by thermally conducting joiners.

41. The superconductor geothermal exchange system of claim 39, wherein, in a programmed bypass operating mode, said earth source bypass switch is disconnected such that said intensifying heat exchanger is bypassed and direct heat transfer is provided in a direct cooling mode, said switch disconnection maintained for a programmed minimum cooling rate.

42. The superconductor geothermal exchange system of claim 38, further comprising a plurality of thermal superconductor heat exchange coils thermally coupled to a plurality of associated heat exchange thermal switches having an off-position coupled to said heating and cooling exchange buses, said heat exchange thermal switches independently connected to said thermostat controller, at least one earth source bypass thermal switch thermally connected in series between said ground coil thermal switch and said intensifying heat exchanger and electrically connected to said controller, wherein, in a programmed bypass operating mode, said earth source thermal switch is disconnected and said plurality of heat exchange thermal switches are independently switched to one of said heating and cooling exchange buses, and wherein at least one heat exchange coil is thermally connected to the cooling exchange bus in cooling mode and one heat exchange coil is thermally connected to the heating exchange bus in heating mode such that a heat exchange circuit is completed independently of earth source heat exchange.

43. The superconductor geothermal exchange system of claim 1, wherein said ground coil thermal switch and said heat exchange thermal switch are embodied in a 2-way thermal switch thermally connected to said condenser and evaporator heat exchange segments and to said second thermal superconductor exchange segment, said 2-way switch coupleable to said above-ground thermal superconductor segment such that in a first switch position said above-ground thermal superconductor segment is thermally coupleable to said condenser heat exchange segment and said second thermal superconducting exchange segment is thermally coupled to said evaporator heat exchange segment to operate in a cooling mode, and in a second switch position said above-ground thermal superconductor segment is thermally coupleable to said evaporator heat exchange segment and said second thermal superconductor exchange segment is thermally coupled to said condenser heat exchange segment to operate in a heating mode.

44. A superconductor geothermal exchange system having a plurality of thermal superconductors coupleable to at least one outside ground coil formed from a thermal superconductor material and extending below ground level to allow passive thermal conduction between an earth source and an above-ground thermal superconductor segment, the system comprising:
  (a) a heat exchange coil formed from thermal superconductor material, having a heat transfer segment terminating at opposite ends at a first thermal superconductor exchange segment and a second thermal superconductor exchange segment;
  (b) a reversible intensifying heat exchanger comprising:
    (1) a refrigerant coil receiving refrigerant in a heating and cooling cycle, said refrigerant coil comprising:
      (i) a first heat exchange segment thermally coupled to said second thermal superconductor exchange segment;:
      (ii) a second exchange segment of said coil thermally coupleable to said above-ground thermal superconductor segment;:
    (2) a bi-directional expander for expanding liquid refrigerant to a vaporous state, said expander located between said first and second thermal superconductor exchange segments;
    (3) a compressor for compressing and circulating refrigerant in said refrigerant coil;
    (4) a reversing valve fluidly to each of said first and second thermal superconductor exchange segments, said reversing valve controlling the direction of flow of said refrigerant exiting said compressor, said reversing valve operable between a cooling position, in which said refrigerant is circulated through said first thermal superconductor exchange segment, and a heating position, in which said refrigerant is circulated through said second exchange segment;
  (c) a thermostat controller associated with an indoor space, said thermostat programmable with a desired set point temperature, said thermostat controller electrically connected to a thermal sensor for measuring said indoor space temperature, said thermostat controller electrically connected to said compressor and to said reversing valve for selectively moving said reversing valve between said cooling position and said heating position; wherein said reversing valve is controlled to select one of a heating mode and a cooling mode, said valve position being selected in response to a calculated difference between said set point temperature and said measured temperature, said controller actuating said compressor in response to said calculated difference.

45. The superconductor geothermal exchange system of claim 44, further comprising at least one outside ground coil formed from a thermal superconductor material, said at least one outside ground coil extending below ground level allowing passive thermal conduction to the earth source.

46. The superconductor geothermal exchange system of claim 45, wherein system coefficient of performance is greater than 2.0.

47. The superconductor geothermal exchange system of claim 44, wherein said thermal superconductor material is an inorganic heat transfer medium.

48. The superconductor geothermal exchange system of claim 47, wherein said high heat transfer medium is disposed in a sealed heat transfer pipe.

49. The superconductor geothermal exchange system of claim 44, wherein said thermal superconductor material is disposed in heat transfer pipes, each of said heat transfer pipes insulated along at least a portion thereof, said heat transfer pipes having thermal conductivity greater than 100 times elemental silver thermal conductivity and having substantially negligible heat loss along said thermal superconductor segment.

50. The superconductor geothermal exchange system of claim 44, wherein said compressor operable at consumed power less than 4500 W.

51. The superconductor geothermal exchange system of claim 50, wherein said compressor is operable at consumed power less than 1800 W.

52. The superconductor geothermal exchange system of claim 44, further comprising a power adapter connected to said compressor and said controller.

53. The superconductor geothermal exchange system of claim 52, wherein said power adapter is a power converter coupleable to an alternative energy source selected from the group consisting of a photovoltaic array, a wind generator and a fuel cell.

54. The superconductor geothermal exchange system of claim 52, wherein said power adapter is a power converter for converting AC power to DC power, said DC power supplied to said compressor.

55. The superconductor geothermal exchange system of claim 52, wherein said power converter comprises a power conditioning circuit for converting unconditioned electric power from an alternative energy source to conditioned electric power suitable to operate said compressor.

56. The superconductor geothermal exchange system of claim 44, wherein at least a portion of said thermal superconductor material is formed in discrete segments connected by thermally conducting joiners.

57. The superconductor geothermal exchange system of claim 45, further comprising a coupler separating said above-ground thermal superconductor segment into two thermally coupled segments.

58. The superconductor geothermal exchange system of claim 44, further comprising a blower positioned proximal to said first thermal superconductor exchange segment of said heat exchange coil, and wherein said controller is electrically connected to said blower to actuate said blower in response to a calculated difference between said measured temperature and said set point temperature.

59. The superconductor geothermal exchange system of claim 58, wherein said first thermal superconductor exchange segment is arranged as a condenser array with area substantially corresponding to said blower area, thereby increasing heat exchange with air.

60. The superconductor geothermal exchange system of claim 44, further comprising an auxiliary heat exchange fluid circulation loop thermally coupled to said first thermal superconductor exchange segment, said loop comprising a fluid circulation device.

61. The superconductor geothermal exchange system of claim 60, wherein said heat exchange fluid is water and said fluid circulating device is a water pump.

62. The superconductor geothermal exchange system of claim 60, wherein said auxiliary heat exchange fluid circulation loop supplies heat to a surface of said space.

63. The superconductor geothermal exchange system of claim 60, wherein said auxiliary heat exchange fluid circulation loop supplies heat to potable water.

64. The superconductor geothermal exchange system of claim 60, wherein said auxiliary heat exchange fluid circulation loop recovers heat from wastewater.

65. The superconductor geothermal exchange system of claim 44, wherein said heat exchange fluid is a refrigerant and said fluid circulation device comprises a compressor and an evaporator.

66. The superconductor geothermal exchange system of claim 65, wherein said heat exchange fluid is directed to a refrigerator.

67. The superconductor geothermal exchange system of claim 44, further comprising a wireless signal receiver electrically connected to said thermostat controller and a remote control device for transmitting wireless signals to said receiver, said set point temperature programmable from said remote control device.

68. The superconductor geothermal exchange system of claim 44, wherein a segment of said heat exchange coil is arranged as a thermal conductor bus thermally coupled to a plurality of said first thermal superconductor segments.

69. The superconductor geothermal exchange system of claim 68, further comprising a plurality of blowers positioned proximal to each of said first thermal superconductor exchange segments and electrically connected to said controller, whereby a plurality of heat exchanges can occur at a plurality of locations in said space.

70. The superconductor geothermal exchange system of claim 69, further comprising a plurality of thermal sensors associated with said plurality of locations and electrically connected to said controller.

71. The superconductor geothermal exchange system of claim 58, further comprising:
(i) a first enclosure for housing said power supply, said controller, said intensifying heat exchanger;
(ii) a second enclosure for housing said first thermal superconductor exchange segment, a blower positioned proximal to said first thermal superconductor exchange segment, said second enclosure having at least one vent in fluid communication with said blower;
wherein said first enclosure has openings formed therein such that said ground thermal switch is thermally coupleable to said above-ground thermal superconductor segment, and wherein said first enclosure and said second enclosure are thermally connected by at least said second thermal superconductor exchange segment and electrically connected by a control line to said blower.

72. The superconductor geothermal exchange system of claim 71, wherein said controller is electrically connected to said blower.

73. The superconductor geothermal exchange system of claim 71, wherein operating noise from said second enclosure is less than 45 dB during in said heating and cooling modes.

74. The superconductor geothermal exchange system of claim 58, further comprising an enclosure for housing said power supply, said controller, said intensifying heat exchanger, said first thermal superconductor exchange segment, a blower positioned proximal to said first thermal superconductor exchange segment, said enclosure having venting near said blower, wherein said first enclosure has openings formed therein such that said ground thermal switch is thermally coupleable to said above-ground thermal superconductor segment.

75. The cooling device of claim 58, wherein said first thermal superconductor exchange segment is arranged as a condenser array with area substantially corresponding to said blower area, thereby increasing heat exchange with air.

* * * * *